United States Patent
Sun et al.

(10) Patent No.: US 10,674,449 B2
(45) Date of Patent: Jun. 2, 2020

(54) SIGNAL FOR A SYNCHRONIZED COMMUNICATION SYSTEM OPERATING IN A SHARED SPECTRUM FREQUENCY BAND

(71) Applicant: QUALCOMM Incorporated, San Diego, CA (US)

(72) Inventors: Jing Sun, San Diego, CA (US); Xiaoxia Zhang, San Diego, CA (US); Taesang Yoo, San Diego, CA (US); Aleksandar Damnjanovic, Del Mar, CA (US); Tamer Kadous, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/187,836

(22) Filed: Nov. 12, 2018

(65) Prior Publication Data

US 2019/0150088 A1 May 16, 2019

Related U.S. Application Data

(60) Provisional application No. 62/585,414, filed on Nov. 13, 2017.

(51) Int. Cl.
*H04B 1/38* (2015.01)
*H04W 52/02* (2009.01)
(Continued)

(52) U.S. Cl.
CPC .......... *H04W 52/0229* (2013.01); *H04B 7/26* (2013.01); *H04W 52/028* (2013.01);
(Continued)

(58) Field of Classification Search
CPC ......... H04W 52/0229; H04W 74/0808; H04W 16/14; H04W 88/02
(Continued)

(56) References Cited

U.S. PATENT DOCUMENTS

| 8,976,720 B2 * | 3/2015 | Nourbakhsh ..... H04W 52/0235 370/311 |
| 2009/0209265 A1 * | 8/2009 | Kwon ................... H04W 16/14 455/454 |

(Continued)

OTHER PUBLICATIONS

Intel Corporation: "Enhancements to Initial Access and Mobility for NR-Unlicensed", 3GPP Draft; R1-1812483—Intel-Enhancements to Initial-Access-Mobility for NR-U, 3rd Generation Partnership-Project (3GPP), Mobile Competence Centre; 650 Route Des Lucioles; F-06921 Sophia-Antipolis Cedex; France, vol. RAN WG1, No. Spokane, USA; Nov. 12, 2018-Nov. 16, 2018, Nov. 3, 2018, XP051478712, Retrieved from the Internet: URL:http://www.3gpp.org/ftp/tsg%5Fran/WG1%5FRL1/TSGR1%5F95/Docs/R1%2D1812483%2Ezip [retrieved on Nov. 3, 2018], 6 pages.
(Continued)

*Primary Examiner* — April G Gonzales
(74) *Attorney, Agent, or Firm* — Holland & Hart LLP/Qualcomm

(57) ABSTRACT

Techniques are described herein for using a signal to wake up a user equipment (UE) that is in a low-power mode in a synchronized wireless communication system operating a shared radio frequency spectrum band. Once a base station wins a contention for a transmission opportunity in the shared radio frequency spectrum band, the base station may transmit a single signal before the transmission opportunity. After receiving the signal, the UE may begin monitoring for control information (e.g., control resource sets) associated with slots in the transmission opportunity. If the control
(Continued)

information indicates that the content of the slot is for the UE, the UE may monitor the slot for its content.

31 Claims, 16 Drawing Sheets

(51) Int. Cl.
*H04W 72/12* (2009.01)
*H04W 74/08* (2009.01)
*H04B 7/26* (2006.01)
*H04W 16/14* (2009.01)
*H04W 88/02* (2009.01)

(52) U.S. Cl.
CPC ... *H04W 52/0216* (2013.01); *H04W 72/1289* (2013.01); *H04W 74/0808* (2013.01); *H04W 74/0816* (2013.01); *H04W 16/14* (2013.01); *H04W 88/02* (2013.01)

(58) Field of Classification Search
USPC .......................................................... 455/574
See application file for complete search history.

(56) References Cited

U.S. PATENT DOCUMENTS

| | | | | |
|---|---|---|---|---|
| 2011/0182201 A1* | 7/2011 | Pajukoski | ............. | H04W 52/22 370/252 |
| 2013/0107116 A1* | 5/2013 | Charbit | .................. | H04L 5/003 348/388.1 |
| 2013/0208587 A1* | 8/2013 | Bala | ...................... | H04W 16/14 370/230 |
| 2015/0043456 A1* | 2/2015 | Rikkinen | ............. | H04B 1/7143 370/329 |
| 2015/0223243 A1* | 8/2015 | Tabet | .................. | H04W 28/085 370/330 |
| 2015/0244618 A1* | 8/2015 | Chakrabarti | ............ | H04L 45/74 370/329 |
| 2015/0244840 A1* | 8/2015 | Chakrabarti | ........ | H04L 61/6059 370/328 |
| 2015/0245245 A1* | 8/2015 | Chakrabarti | ............ | H04W 4/70 370/338 |
| 2015/0271847 A1* | 9/2015 | Luo | ........................ | H04L 5/0064 370/329 |
| 2016/0095134 A1* | 3/2016 | Chen | ..................... | H04L 1/1861 370/336 |
| 2016/0381589 A1* | 12/2016 | Zhang | ..................... | H04L 5/001 370/252 |
| 2017/0155488 A1* | 6/2017 | Saxena | ................. | H04L 5/0053 |
| 2017/0163388 A1* | 6/2017 | Wiemann | ............... | H04L 1/1851 |
| 2017/0215083 A1* | 7/2017 | Kudo | ..................... | H04W 16/14 |
| 2017/0251380 A1* | 8/2017 | Schabel | ................. | H04W 16/14 |
| 2017/0331577 A1* | 11/2017 | Parkvall | ............... | H04J 11/0079 |
| 2017/0331670 A1* | 11/2017 | Parkvall | .............. | H04L 41/0816 |
| 2017/0359850 A1* | 12/2017 | Loehr | ................. | H04W 72/042 |
| 2018/0124789 A1* | 5/2018 | Yerramalli | ................ | H04L 1/12 |
| 2018/0176787 A1* | 6/2018 | Fakoorian | ............. | H04W 16/14 |

OTHER PUBLICATIONS

Interdigital Inc: "C-DRX with Multiple Configurations", 3GPP Draft; R2-1706683, 3rd Generation Partnership-Project (3GPP), Mobile Competence Centre; 650 Route Des Lucioles; F-06921 Sophia-Antipolis Cedex; France, vol. RAN WG2, No. Qingdao, P.R. China; Jun. 27, 2017-Jun. 29, 2017 Jun. 26, 2017, XP051301183, Retrieved from the Internet: URL:http://www.3gpp.org/ftp/Meetings_3GPP_SYNC/RAN2/Docs/ [retrieved on Jun. 26, 2017], 5 pages.
International Search Report and Written Opinion—PCT/US2018/060698—ISA/EPO—dated Feb. 11, 2019.
Panasonic: "DRX operation for LAA", 3GPP Draft; R2-151161, 3rd Generation Partnership-Project (3GPP), Mobile Competence Centre; 650 Route Des Lucioles; F-06921 Sophia-Antipolis Cedex; France, vol. RAN WG2, No. Bratislava, Slovakia; Apr. 20, 2015-Apr. 24, 2015 Apr. 10, 2015, XP050952941, Retrieved from the Internet: URL:http://www.3gpp.org/ftp/tsg_ran/WG2_RL2/TSGR2_89bis/Docs/ [retrieved on Apr. 10, 2015], 2 pages.

\* cited by examiner

SIGNAL FOR A SYNCHRONIZED COMMUNICATION SYSTEM OPERATING IN A SHARED SPECTRUM FREQUENCY BAND

CROSS REFERENCE

The present Application for patent claims the benefit of U.S. Provisional Patent Application No. 62/585,414 by SUN, et al., entitled "WAKE-UP SIGNAL FOR A SYNCHRONIZED COMMUNICATION SYSTEM OPERATING IN A SHARED SPECTRUM FREQUENCY BAND," filed Nov. 13, 2017, assigned to the assignee hereof, and which is expressly incorporated by reference herein.

BACKGROUND

The following relates generally to wireless communication, and more specifically to a signal for a synchronized communication system operating in a shared spectrum frequency band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may operate using synchronized protocols (e.g., contention-free protocols) in a shared radio frequency spectrum that allocates resources based on contention-based protocols. Such wireless communication systems may include procedures and protocols to address issues from using a synchronized protocol in a shared frequency spectrum.

SUMMARY

The described techniques relate to improved methods, systems, devices, or apparatuses that support a signal for a synchronized communication system operating in a shared spectrum frequency band. Generally, the described techniques relate to using a signal to wake up a UE that is in a low-power mode in a synchronized wireless communication system operating a shared radio frequency spectrum band. Once a base station is granted a transmission opportunity in the shared radio frequency spectrum band, the base station may transmit a single signal. In some cases, this signal is transmitted before the transmission opportunity. After receiving the signal, the UE may begin monitoring for control information (e.g., control resource sets) associated with slots in the transmission opportunity. If the control information indicates that the content of the slot is for the UE, the UE may monitor the slot for its content.

A method of wireless communication at a user equipment (UE) is described. The method may include performing, in a synchronized communication system operating in a shared spectrum frequency band, discontinuous monitoring of a plurality of potential locations for a signal, receiving the signal in one of the plurality of potential locations, remaining awake, based at least in part on receiving the signal, to process a control resource set associated with a downlink transmission opportunity, determining that a content of the downlink transmission opportunity will include content for the UE based at least in part on processing the control resource set, and monitoring at least a portion of the downlink transmission opportunity based at least in part on determining that the content includes the content for the UE.

An apparatus for wireless communication at a user equipment (UE) is described. The apparatus may include means for performing, in a synchronized communication system operating in a shared spectrum frequency band, discontinuous monitoring of a plurality of potential locations for a signal, means for receiving the signal in one of the plurality of potential locations, means for remaining awake, based at least in part on receiving the signal, to process a control resource set associated with a downlink transmission opportunity, means for determining that a content of the downlink transmission opportunity will include content for the UE based at least in part on processing the control resource set, and means for monitoring at least a portion of the downlink transmission opportunity based at least in part on determining that the content includes the content for the UE.

Another apparatus for wireless communication at a user equipment (UE) is described. The apparatus may include a processor, memory in electronic communication with the processor, and instructions stored in the memory. The instructions may be operable to cause the processor to perform, in a synchronized communication system operating in a shared spectrum frequency band, discontinuous monitoring of a plurality of potential locations for a signal, receive the signal in one of the plurality of potential locations, remain awake, based at least in part on receiving the signal, to process a control resource set associated with a downlink transmission opportunity, determine that a content of the downlink transmission opportunity will include content for the UE based at least in part on processing the control resource set, and monitor at least a portion of the downlink transmission opportunity based at least in part on determining that the content includes the content for the UE.

A non-transitory computer-readable medium for wireless communication at a user equipment (UE) is described. The non-transitory computer-readable medium may include instructions operable to cause a processor to perform, in a synchronized communication system operating in a shared spectrum frequency band, discontinuous monitoring of a plurality of potential locations for a signal, receive the signal in one of the plurality of potential locations, remain awake, based at least in part on receiving the signal, to process a control resource set associated with a downlink transmission opportunity, determine that a content of the downlink transmission opportunity will include content for the UE based at least in part on processing the control resource set, and monitor at least a portion of the downlink transmission opportunity based at least in part on determining that the content includes the content for the UE.

In some examples of the method, apparatus, and non-transitory computer-readable medium described above, remaining awake may further include activating one or more additional circuits to process the control resource set.

In some examples of the method, apparatus, and non-transitory computer-readable medium described above, the plurality of potential locations includes one or more potential locations within a second downlink transmission opportunity before the downlink transmission opportunity.

Some examples of the method, apparatus, and non-transitory computer-readable medium described above may further include processes, features, means, or instructions for determining that a content of a slot of the downlink transmission opportunity does not includes information for the UE. Some examples of the method, apparatus, and non-transitory computer-readable medium described above may further include processes, features, means, or instructions for entering a sleep state for a duration of the slot based at least in part on determining that the information of the slot may be not for the UE.

Some examples of the method, apparatus, and non-transitory computer-readable medium described above may further include processes, features, means, or instructions for monitoring for a next configured control resource set based at least in part on entering the sleep state.

In some examples of the method, apparatus, and non-transitory computer-readable medium described above, the signal may be a single waveform detectable using an auto-correlation function.

In some examples of the method, apparatus, and non-transitory computer-readable medium described above, the signal may be a wide-band waveform including one or more repetitions of a short sequence.

In some examples of the method, apparatus, and non-transitory computer-readable medium described above, the signal may be a channel reservation preamble used to reserve channels for other nodes.

In some examples of the method, apparatus, and non-transitory computer-readable medium described above, the signal may be detected using a first procedure that may be different from a second procedure configured to decode the control resource set.

In some examples of the method, apparatus, and non-transitory computer-readable medium described above, the first procedure consumes less power when detecting the signal than the second procedure when detecting the signal.

Some examples of the method, apparatus, and non-transitory computer-readable medium described above may further include processes, features, means, or instructions for identifying a plurality of downlink transmission starting opportunities, where the plurality of downlink transmission starting opportunities may be positionable at a slot boundary and in a middle of a slot. Some examples of the method, apparatus, and non-transitory computer-readable medium described above may further include processes, features, means, or instructions for monitoring for the signal before each of the plurality of downlink transmission starting opportunities, where receiving the signal may be based at least in part on monitoring for the signal before each of the plurality of downlink transmission starting opportunities.

In some examples of the method, apparatus, and non-transitory computer-readable medium described above, the signal may be transmitted after a clear channel assessment period of a listen-before-talk procedure of the shared spectrum frequency band.

Some examples of the method, apparatus, and non-transitory computer-readable medium described above may further include processes, features, means, or instructions for identifying a plurality of slots of the downlink transmission opportunity based at least in part on receiving the signal. Some examples of the method, apparatus, and non-transitory computer-readable medium described above may further include processes, features, means, or instructions for monitoring at least a portion of each slot of the plurality of slots for the control resource set, where processing the control resource set may be based at least in part on monitoring each slot of the plurality of slots for control resource sets.

A method of wireless communication at a base station is described. The method may include identifying information to be transmitted to a user equipment (UE), identifying a transmission opportunity to transmit the information to the UE using a synchronized communication system operating in a shared spectrum frequency band, transmitting a signal at one of a plurality of potential locations before the transmission opportunity as part of a listen-before-talk (LBT) procedure, and transmitting a downlink transmission burst including one or more slots based at least in part on transmitting the signal.

An apparatus for wireless communication a base station is described. The apparatus may include means for identifying information to be transmitted to a user equipment (UE), means for identifying a transmission opportunity to transmit the information to the UE using a synchronized communication system operating in a shared spectrum frequency band, means for transmitting a signal at one of a plurality of potential locations before the transmission opportunity as part of a listen-before-talk (LBT) procedure, and means for transmitting a downlink transmission burst including one or more slots based at least in part on transmitting the signal.

Another apparatus for wireless communication a base station is described. The apparatus may include a processor, memory in electronic communication with the processor, and instructions stored in the memory. The instructions may be operable to cause the processor to identify information to be transmitted to a user equipment (UE), identify a transmission opportunity to transmit the information to the UE using a synchronized communication system operating in a shared spectrum frequency band, transmit a signal at one of a plurality of potential locations before the transmission opportunity as part of a listen-before-talk (LBT) procedure, and transmit a downlink transmission burst including one or more slots based at least in part on transmitting the signal.

A non-transitory computer-readable medium for wireless communication a base station is described. The non-transitory computer-readable medium may include instructions operable to cause a processor to identify information to be transmitted to a user equipment (UE), identify a transmission opportunity to transmit the information to the UE using a synchronized communication system operating in a shared spectrum frequency band, transmit a signal at one of a plurality of potential locations before the transmission opportunity as part of a listen-before-talk (LBT) procedure, and transmit a downlink transmission burst including one or more slots based at least in part on transmitting the signal.

In some examples of the method, apparatus, and non-transitory computer-readable medium described above, the signal may be transmitted after a clear channel assessment period of the LBT procedure.

Some examples of the method, apparatus, and non-transitory computer-readable medium described above may further include processes, features, means, or instructions for transmitting the information to the UE during at least one slot of the transmission opportunity.

Some examples of the method, apparatus, and non-transitory computer-readable medium described above may further include processes, features, means, or instructions for transmitting information for a second UE different from the UE during at least one slot of the transmission opportunity.

In some examples of the method, apparatus, and non-transitory computer-readable medium described above, the downlink transmission starting opportunity may be positionable at a slot boundary or in a middle of a slot. Some examples of the method, apparatus, and non-transitory computer-readable medium described above may further include processes, features, means, or instructions for transmitting the signal before the downlink transmission starting opportunity.

In some examples of the method, apparatus, and non-transitory computer-readable medium described above, the signal may be a single waveform detectable using an auto-correlation function.

In some examples of the method, apparatus, and non-transitory computer-readable medium described above, the signal may be at least a portion of a wide-band channel reservation preamble.

DETAILED DESCRIPTION

Figure 1:
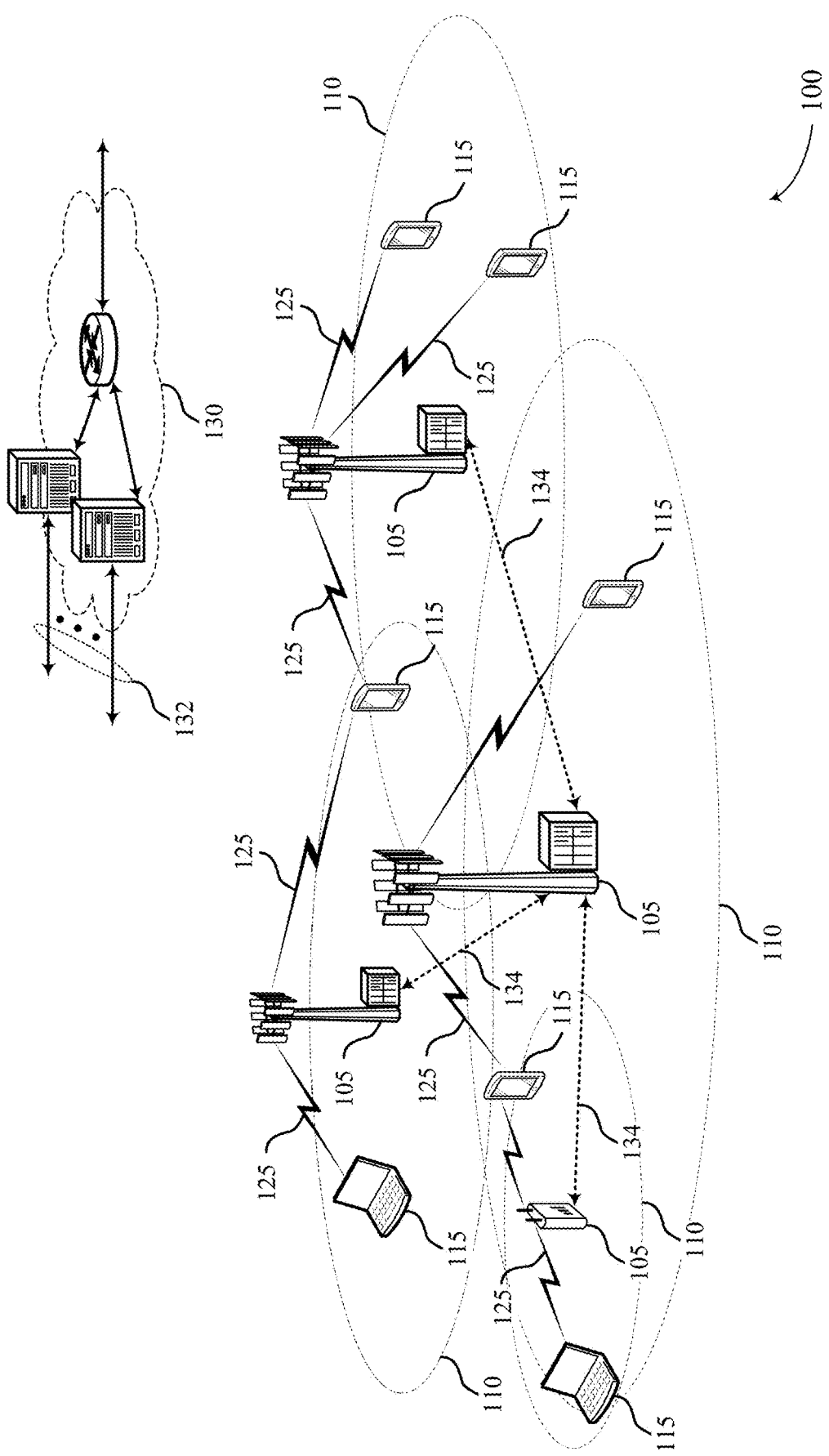
FIG. 1 illustrates an example of a system for wireless communication that supports a signal for a synchronized communication system operating in a shared spectrum frequency band in accordance with aspects of the present disclosure.

Some wireless communication systems may implement a synchronize or managed radio access technology where communications between nodes are managed by a central scheduling entity (e.g., a base station in LTE). In some cases, a synchronized wireless communication system may be configured to operate in a shared frequency spectrum band that allocates transmission opportunities based on contention-based protocols. In such cases, the scheduling entity (e.g., base station) of the synchronized wireless communication system may contend for transmission opportunities with other entities in the shared frequency spectrum. Once the scheduling entity is granted a transmission opportunity, the scheduling entity may allocate one or more portions of the transmission opportunity to one or more nodes (e.g., UEs) according to resource scheduling procedures.

The interactions between transmission opportunities of the shared radio frequency spectrum and a slot structure of the synchronized slot structure of the synchronized wireless communication system may cause certain resources to go unused when a connected node (e.g., a UE) is in a low-power mode. When in a low-power mode, the connected node (e.g., a UE) will periodically wake-up and monitor for control signals from the scheduling entity (e.g., base station). The connected node (e.g., a UE) may be configured to monitor for control signals from the scheduling entity multiple times during a duration (e.g., a single slot duration). Such frequent monitoring, however, may reduce the amount of power saved during a low-power mode particularly as the frequency of such monitoring increases.

Techniques are described herein for using a signal to wake up a UE that is in a low-power mode in a synchronized wireless communication system operating a shared radio frequency spectrum band. Once a base station wins the contention for a transmission opportunity in the shared radio frequency spectrum band, the base station may transmit a single signal before the transmission opportunity. The UE may be configured to wake-up in a second low-power mode to detect the signal at potential signal locations. If the signal is not received, the UE may return to the low-power mode. After receiving the signal, the UE may leave the low-power mode and begin monitoring for control information (e.g., control resource sets) associated with slots in the transmission opportunity. If the control information indicates that the content of the slot is for the UE, the UE may monitor the slot for its content. If the control information indicates that the content of the slot is not for the UE, the UE may enter or reenter the low-power mode for a period (e.g., a sleep period).

Aspects of the disclosure are initially described in the context of a wireless communications system. Aspects of the disclosure are described in the context of timing diagrams and a communication scheme. Aspects of the disclosure are further illustrated by and described with reference to apparatus diagrams, system diagrams, and flowcharts that relate to a signal for a synchronized communication system operating in a shared spectrum frequency band.

FIG. 1 illustrates an example of a wireless communications system 100 that supports a signal for a synchronized communication system operating in a shared spectrum frequency band in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). Some examples of shared spectrum include licensed radio frequency spectrum, unlicensed radio frequency spectrum, or a combination of licensed and unlicensed radio frequency spectrum, among others. An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods.

In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. In some cases, a shared spectrum may include licensed RF spectrum, unlicensed RF spectrum, or a combination of licensed and unlicensed RF spectrum.

The wireless communication system 100 may use a signal to wake up a UE 115 that is in a low-power mode when the base station 105 and the UE 115 are communicating using resources in a shared radio frequency spectrum band. Once the base station 105 wins the contention for a transmission opportunity in the shared radio frequency spectrum band, the base station 105 may transmit a single signal before the transmission opportunity to the UE 115. After receiving the signal, the UE 115 may begin monitoring for control information (e.g., control resource sets) associated with slots in the transmission opportunity. If the control information indicates that the content of the slot is for the UE 115, the UE 115 may monitor the slot for its content.

Figure 2:
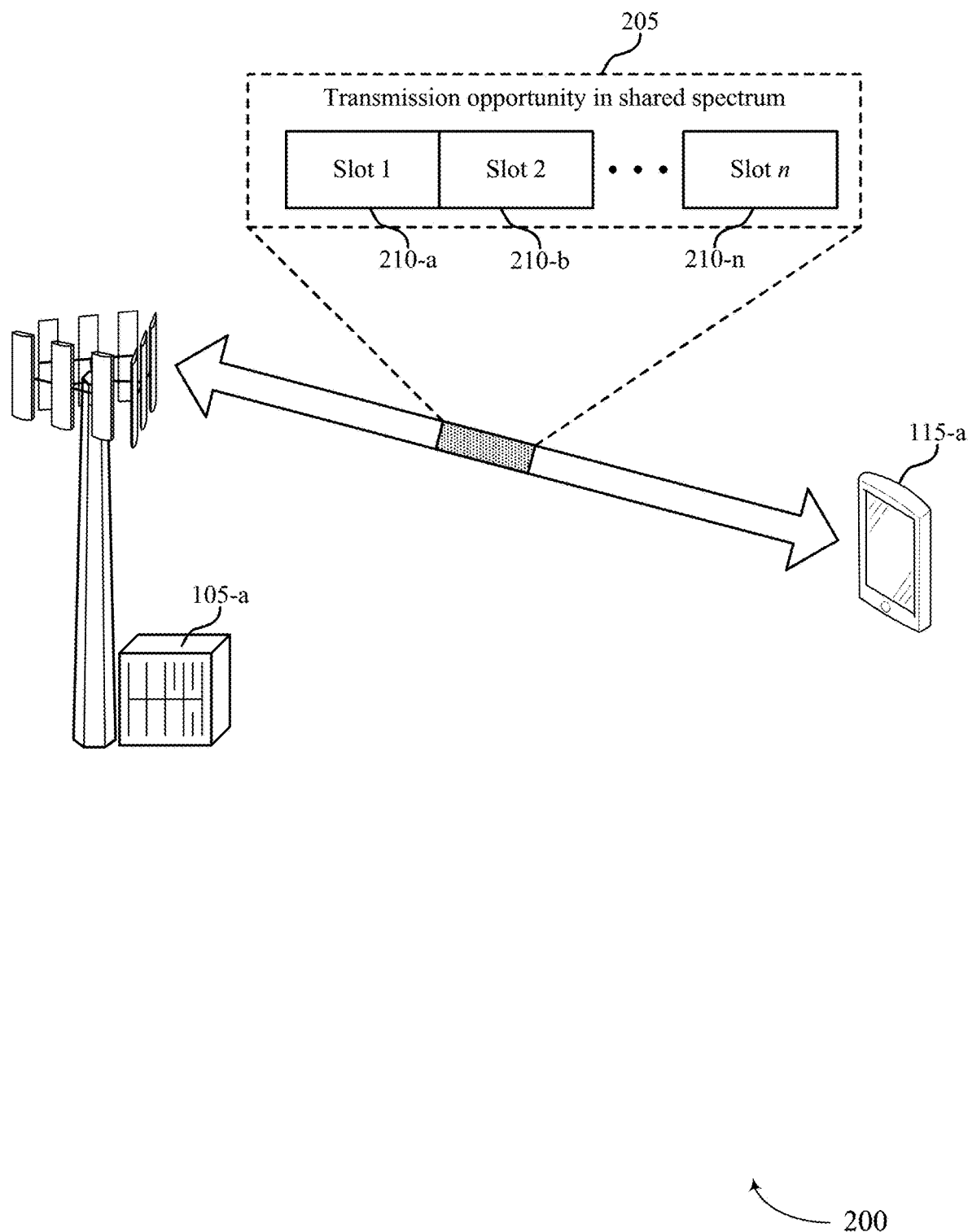
FIG. 2 illustrates an example of a wireless communication system that supports a signal for a synchronized communication system operating in a shared spectrum frequency band in accordance with aspects of the present disclosure.

FIG. 2 illustrates an example of a wireless communication system 200 that supports a signal for a synchronized communication system operating in a shared spectrum frequency band in accordance with various aspects of the present disclosure. In some examples, the wireless communication system 200 may implement aspects of the wireless communication system 100. The wireless communication system 200 may be an example of a synchronized wireless communication system operating in a shared frequency spectrum band.

Wireless communication systems may use radio waves to communicate information between different nodes. Frequently, wireless communication systems use one or more types of radio access technologies (RATs) to modulate data and transport that modulated data using carrier frequencies found in the radio frequency spectrum. There is a finite amount of carrier frequencies that are utilized for wireless communication systems. To reduce interference between different entities that want to communicate data using the radio frequency spectrum, the radio frequency spectrum has been divided into radio frequency spectrum bands and these bands have been allocated to different uses.

For example, some frequency bands are allocated to radio communications, some to television communications, some to satellite communications, some to wireless communications, etc. Of the radio frequency bands that are allocated to wireless communications, some radio frequency bands are licensed radio frequency spectrum bands and some are unlicensed radio frequency spectrum bands. In licensed bands, an entity pays a licensing fee for the exclusive right to communicate information on that frequency spectrum band in a given geographic area. In unlicensed bands, any entity may communicate using the band if that entity complies with certain rules associated with the unlicensed band.

An unlicensed radio frequency spectrum band may be referred to as a shared frequency spectrum band because multiple entities are using the band simultaneously. Shared frequency spectrum bands frequently use contention-based RATs (e.g., Wi-Fi or other Institute of Electrical and Electronics Engineers (IEEE) related standards) to allocate resources to different transmitters/nodes. Contention-based RATs may employ contention-based protocols to allow many users to use the same radio frequency spectrum band without pre-coordination. The listen-before-talk (LBT) procedure specified in the IEEE 802.11 standards may be an example of a contention-based protocol.

In some cases, however, a synchronized wireless communication system that employs a non-contention-based RAT such as LTE or NR-Shared Spectrum (NR-SS) (i.e., a managed wireless communication system) may be used in a shared frequency spectrum band. Such a synchronized wireless communication system may contend for access to the frequency spectrum using a contention-based protocols. Once communication resources have been assigned to the synchronized wireless communication system, the synchronized wireless communication system may have a scheduling entity that coordinates those resources with the various nodes coupled with the scheduling entity.

The wireless communication system 200 may be an example of a synchronized wireless communication system operating in a shared radio frequency spectrum band. The wireless communication system 200 may include a base station 105-a that operates as a scheduling entity for synchronizing communications of the various connected nodes and at least one UE 115-a that acts as a served node of the base station 105-a. A shared radio frequency spectrum band may include licensed radio frequency spectrum, unlicensed radio frequency spectrum, or a combination of licensed and unlicensed radio frequency spectrum.

During operations, the base station 105-a (i.e., the scheduling entity of the synchronized wireless communication system) may contend for access to the shared radio frequency spectrum band with other entities and/or other wireless communication systems (e.g., systems that use other RATs such Wi-Fi). Once the base station 105-a wins a contention for a transmission opportunity 205 (e.g., using a LBT procedure), the base station 105-a may then allocate one or more portions of the transmission opportunity 205 to be used for/by various UEs 115-a coupled with the base station 105-a. For example, the base station 105-a may divide the transmission opportunity 205 into a one or more slots 210. Each slot 210 may be allocated for uplink transmissions, downlink transmissions, or a combination thereof for any UE 115-a (e.g., node of the synchronized wireless communication system).

In some cases, the wireless communication system 200 may utilize directional beam pair links (BPLs) to establish a communication link between the base station 105-a and the UE 115-a. Such BPLs may include a directional transmission beam (either uplink or downlink) and a directional reception beam (either uplink or downlink).

One characteristic of many wireless communication systems is the need for battery-operated nodes to conserve power. Many UEs 115-a may be battery-operated devices such as cell phones, smartphones, tablets, or other personal computing devices. The battery life of such UEs 115-a may not be sufficient to continuously operate at full-power for a full day. In many instances, the UE 115-a may be configured with a sleep mode (e.g., a low-power mode or low-power state) to conserve power during periods that the UE 115-a is not being actively used. As part of many sleep modes, the UE 115-a may deactivate its primary radio and, as such, may not be capable receiving messages from the connected base station 105-a while in the sleep state. To ensure that data is communicated with the UE 115-a in a timely manner, the sleep mode of the UE 115-a may include procedures to periodically wake-up and listen for messages from the base station 105-a. The wireless communication system 200 may include procedures to coordinate the wake-up cycle of the UE 115-*a* with the message transmission cycle of the base station 105-*a*.

The amount of power conserved during a sleep state may be based, at least in part, on a frequency of the wake-up cycle and/or the amount of power used during a wake-up cycle. For example, as the number of wake-up cycles increases, the amount of power savings provided by a sleep mode may decrease. In a synchronized wireless communication system using a shared radio frequency spectrum band, the assignments of transmission opportunities in the shared radio frequency spectrum band may not always coincide with the slot/frame structure of the synchronized wireless communication system. To increase flexibility, the synchronized wireless communication system may need to provide potential starting locations for transmission opportunities at more than one location during a slot duration. Such a configuration may increase the power consumption of the UE 115 during a sleep mode. Techniques are described herein for a synchronized wireless communication system that uses a signal to alert the UE 115-*a* about a transmission opportunity during a sleep mode.

Figure 3:
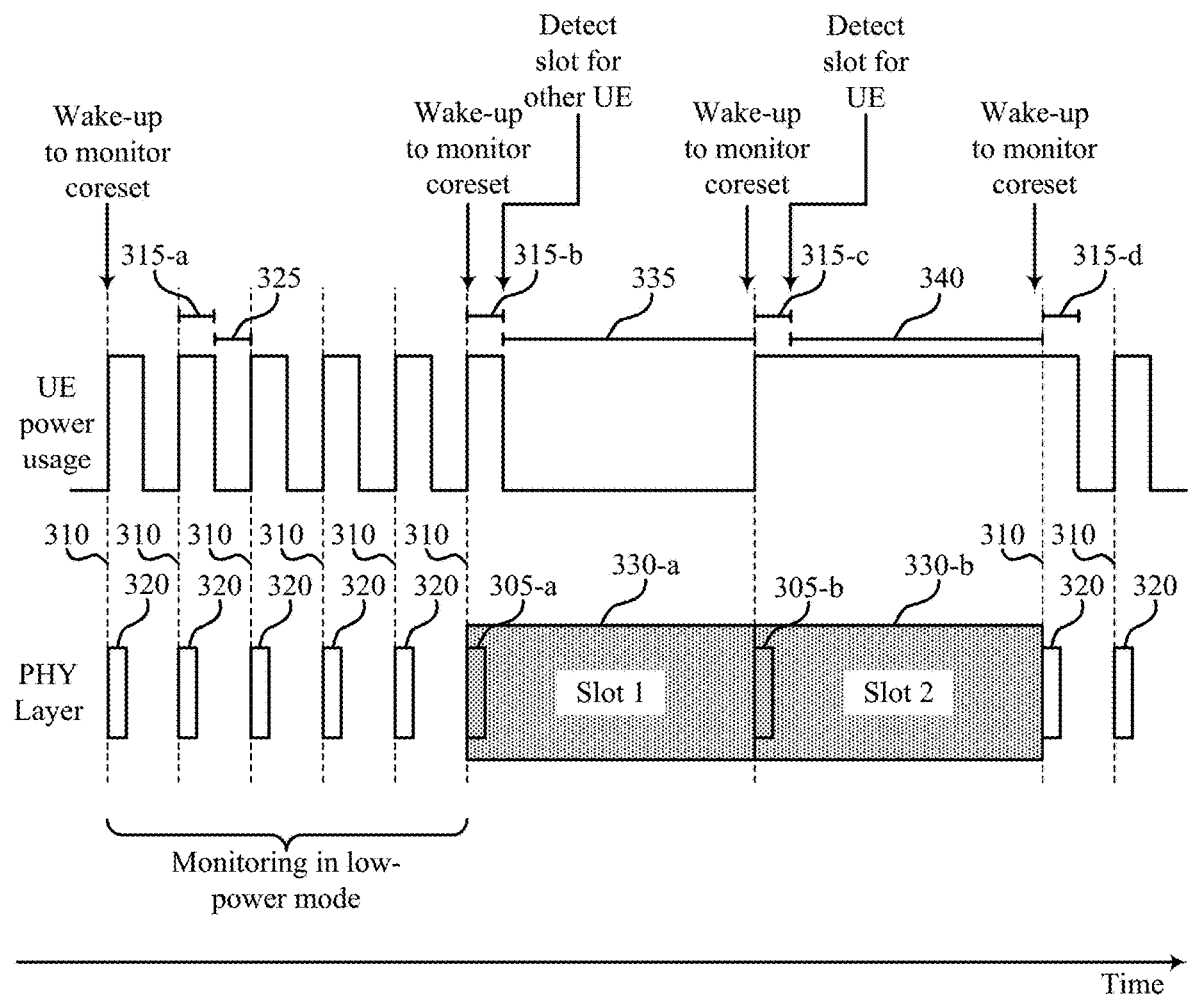
FIG. 3 illustrates an example of a timing diagram that supports a signal for a synchronized communication system operating in a shared spectrum frequency band in accordance with aspects of the present disclosure.

FIG. 3 illustrates an example of a timing diagram 300 that supports a signal for a synchronized communication system operating in a shared spectrum frequency band in accordance with various aspects of the present disclosure. In some examples, the timing diagram 300 may implement aspects of the wireless communications systems 100 and/or 200. The timing diagram 300 shows an example of how a wake-up cycle of a UE 115 in a sleep mode may operate in a synchronized wireless communication system using a shared radio frequency spectrum band. The example shown in the timing diagram 300 may not include the use of a signal.

The timing diagram 300 may illustrate UE power usage during a low-power mode and a depiction of what occurs at the physical (PHY) layer during the low-power mode. The UE 115 may enter a low-power mode before the timing diagram 300 begins. Before entering the low-power mode, the base station 105 and the UE 115 may coordinate parameters of the wake-up cycles and the transmission cycles during the low-power mode.

In the illustrated example, the UE 115 may monitor for a control resource set 305 (coreset) at a plurality of potential slot start times 310 during a period 315. At each potential slot start time 310, there may be a potential coreset location 320. In the illustrated example of the timing diagram 300, the UE 115 monitors a potential coreset location 320 at a plurality of times (e.g., four) during a single slot duration. In some examples, the potential coreset location 320 occurs after the potential slot start time 310.

In some cases, a UE 115 may be configured to only monitor for the coreset 305 at slot boundaries of the synchronized wireless communication system. Transmission opportunities, however, may be granted to the synchronized wireless communication system using the shared radio frequency spectrum band at times other than the slot boundaries. In order to avoid wasting a portion of the transmission opportunity, the base station 105 and the UE 115 may be configured to modify the slot boundaries. Said another way, the synchronized wireless communication system may employ a flexible slot start time to accommodate the different arrival times of a transmission opportunity. As such, the UE 115 may monitor for a coreset 305 at more than one location during a slot duration. For example, the number of potential coreset locations 320 monitored by the UE 115 during a single slot duration may be two, three, four, five, six, seven, eight, nine, ten, eleven, twelve, thirteen, fourteen, etc.

The period 315 may indicate an amount of time the UE 115 is awake during the low-power mode to monitor a potential coreset location 320. At a potential slot start time 310 (or at a beginning of a potential coreset location 320), the UE 115 may wake-up to monitor for a coreset 305. Waking-up may include activating a radio and/or other supporting components (e.g., decoding components) such that the radio and/or other supporting components go from a low-power state to a high-power state. The first portion of the period 315 may be used to receive or attempt to receive a coreset 305 and a second portion of the period 315 may be used to decode or attempt to decode the coreset 305. In some cases, the coreset 305 may be an OFDM signal, the UE 115 may have to fully activate its primary radio and/or various other components to decode the coreset 305. If a coreset 305 is not detected at a potential coreset location 320, the UE 115 may enter or reenter the low-power mode for a period 325 until the next potential slot start time 310 or the next potential coreset location 320. In some cases, the period 325 may be referred to as a microsleep. The functions performed during periods 315 and 325 may be repeated each time the UE 115 monitors a potential coreset location 320.

In some cases, the UE 115 may detect a coreset 305. For example, the UE 115 may detect a first coreset 305-*a* associated with a first slot 330-*a* and a second coreset 305-*b* associated with a second slot 330-*b*. After detecting and/or successfully decoding the coreset 305, the UE 115 may determine whether the slot 330 is intended for use (either uplink or downlink) by the UE 115. In some cases, the slot 330 may be intended for use (either uplink or downlink) by a different UE that is connected to base station 105, other than the UE that is currently decoding the coreset 305.

In some cases, the UE 115 may not be configured to identify the other UE, but is merely configured to determine that the slot is addressed to a UE other than the current UE 115. The UE 115 may also determine whether the slot is intended for uplink or downlink communications. In some cases, the coreset 305 may be an example of resource grant that allocates at least a portion of resources of the associated slot 330 to a UE 115 to use to transmit information to the base station 105. In such cases, the coreset 305 may what resources are assigned, e.g., time resources (slot, subframe, frame) and/or frequency resources to the UE. In some cases, the coreset 305 may include an identifier for the UE that is being allocated the resources indicated in the coreset 305. In some cases, the coreset 305 may be an example of a downlink communication from the base station 105 to the UE 115. In such cases, the coreset 305 may indicate what UE is the intended recipient of the downlink communication.

Examples of how the contents of the coreset could affect a low-power mode of the UE 115 are shown with reference to the first slot 330-*a* and the second slot 330-*b*. For example, after decoding the first coreset 305-*a* associated with the first slot 330-*a*, the UE 115 may determine that the first slot 330-*a* is intended for use by a UE different from the UE 115. In such a situation, the UE 115 may deactivate one or more of its components and enter a low-power mode for a period 335. Because the UE 115 knows that the information is being communicated during the first slot 330-*a*, the UE 115 may refrain from monitoring potential coreset locations 320 during the period 335 (i.e., during the duration of the first slot 330-*a*). The functions performed during period 335 may be repeated each time the UE 115 goes to sleep during a slot 330 based on the contents of the coreset 305 associated with that slot 330.

In another example, after decoding the second coreset 305-b associated with the second slot 330-b, the UE 115 may determine that the second slot 330-b is intended for use by the UE 115. In such a situation, the UE 115 may remain awake for a period 340 and use the second slot 330-b for either uplink or downlink communications based on what was signaled in the second coreset 305-b. After the period 440 has expired (i.e., after the duration of the second slot 330-b is complete), the UE 115 may again monitor potential coreset locations 320. For example, the UE 115 may remain awake after the period 440 and monitor potential coreset location 320 during a period 315-d immediately after the second slot 330-b. The functions performed during 340 may be repeated each time the UE 115 uses at least a portion of the communication resources of a slot 330 based on the contents of the coreset 305 associated with that slot 330.

As the amount of potential slot starting times increases, the number of times the UE 115 must wake up and monitor for signals increases, and the power consumption of the UE 115 increases. Because a coreset is an OFDM signal, the amount of power used to decode the coreset may be more than other types of signals. To reduce power consumption during a low-power mode, a base station 105 of a wireless communication system may use the signal, as described with reference to FIGS. 4-6, to indicate to the UE 115 a beginning of a transmission opportunity.

Figure 4:
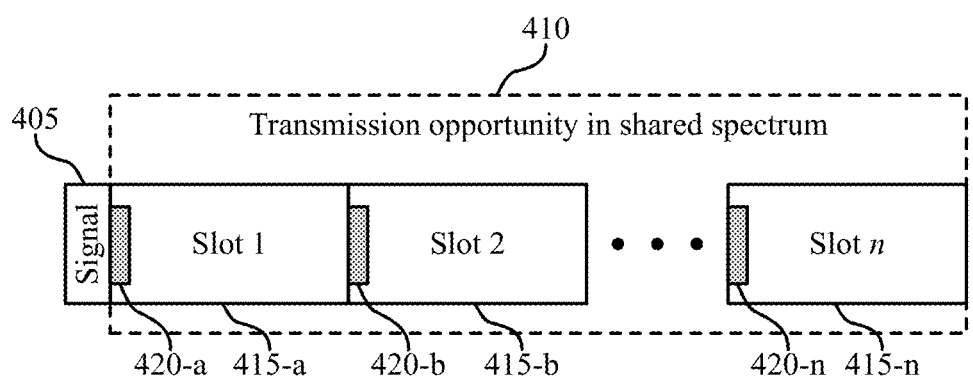
FIG. 4 illustrates an example of a signal structure that supports a signal for a synchronized communication system operating in a shared spectrum frequency band in accordance with aspects of the present disclosure.

FIG. 4 illustrates an example of a signal structure 400 that supports a signal for a synchronized communication system operating in a shared spectrum frequency band in accordance with various aspects of the present disclosure. In some examples, the signal structure 400 may implement aspects of the wireless communications systems 100 and/or 200. The signal structure 400 illustrates a signal 405 associated with a transmission opportunity 410 of a synchronized wireless communication system that uses a shared radio frequency spectrum band. In some cases, the signal 405 may be a wake-up signal, an initial signal, or another initializing signal.

To reduce power consumption during a low-power mode, a base station 105 of a wireless communication system may use the signal 405 to indicate to the UE 115 a beginning of a transmission opportunity 410. The transmission opportunity 410 may include one or more slots 415 and may be an example of the transmission opportunity 205 described with reference to FIG. 2. The base station 105 may be configured to transmit the signal 405 before transmitting a coreset 420 associated with a slot 415. The signal 405 may also be used when the UE has not yet detected the transmission opportunity 410 and/or when the UE 115 is not in a discontinuous reception mode (DRX).

The signal 405 may be configured such that the UE 115 consumes less power monitoring potential signal locations than monitoring potential coreset locations. In some cases, the signal 405 may be a shorter signal (in time) than the coreset 420. In some cases, the signal 405 may be configured to make processing (e.g., decoding at the UE) easier and consume less power. Monitoring for the signal 405 may be an example of discontinuous monitoring where the UE 115 goes to sleep between monitorings.

For example, the signal 405 may be an example of a wide-band waveform. Such a wide-band waveform may be a simpler signal than an OFDM signal and therefore easier to process. Because it may be easier to process, the UE 115 may activate fewer or different components that consume less power than the OFDM waveform of the coreset 420. In some cases, the signal 405 may be an example of a channel reservation preamble used to reserve channels for nodes coupled with the base station 105. In some cases, the signal 405 may be a single waveform detectable using an autocorrelation function. In some cases, the signal 405 may include short sequence of bits that may be repeated. In some cases, the signal 405 does not include any dynamically-configurable information, and instead just includes a sequence that indicates to the UE 115 that the signal is a signal. In some cases, the duration of the signal 405 is fixed. The UE 115 may use the fixed timing of the signal 405 to help identify the signal 405. In some cases, the signal 405 may include various combinations of these features discussed above.

The signal 405 may be associated with a single transmission opportunity 410. For example, when the transmission opportunity 410 is granted to the base station 105 of the synchronized wireless communication system operating in the shared radio frequency spectrum band, the base station 105 may generate and transmit the signal 405. In some cases, the signal 405 may include information about the transmission opportunity 410. For example, the signal 405 may include information about the transmission opportunity 410 (e.g., the number of slots 415 in the transmission opportunity 410 or a time duration of the transmission opportunity 410). The UE 115 may be configured to use such information monitor for coresets 420 and/or to reduce power consumption during the transmission opportunity 410.

The signal 405 may be transmitted to every UE that is coupled with the base station 105. As a result, in some cases, at least a portion of the transmission opportunity 410 may be allocated to other UEs coupled with the base station 105 (i.e., connected UEs that are different from the UE presently doing the decoding). Accordingly, a UE 115 may be configured to enter microsleeps or other low-power states during the transmission opportunity 410 during resources that are allocated to other UEs.

Figure 5:
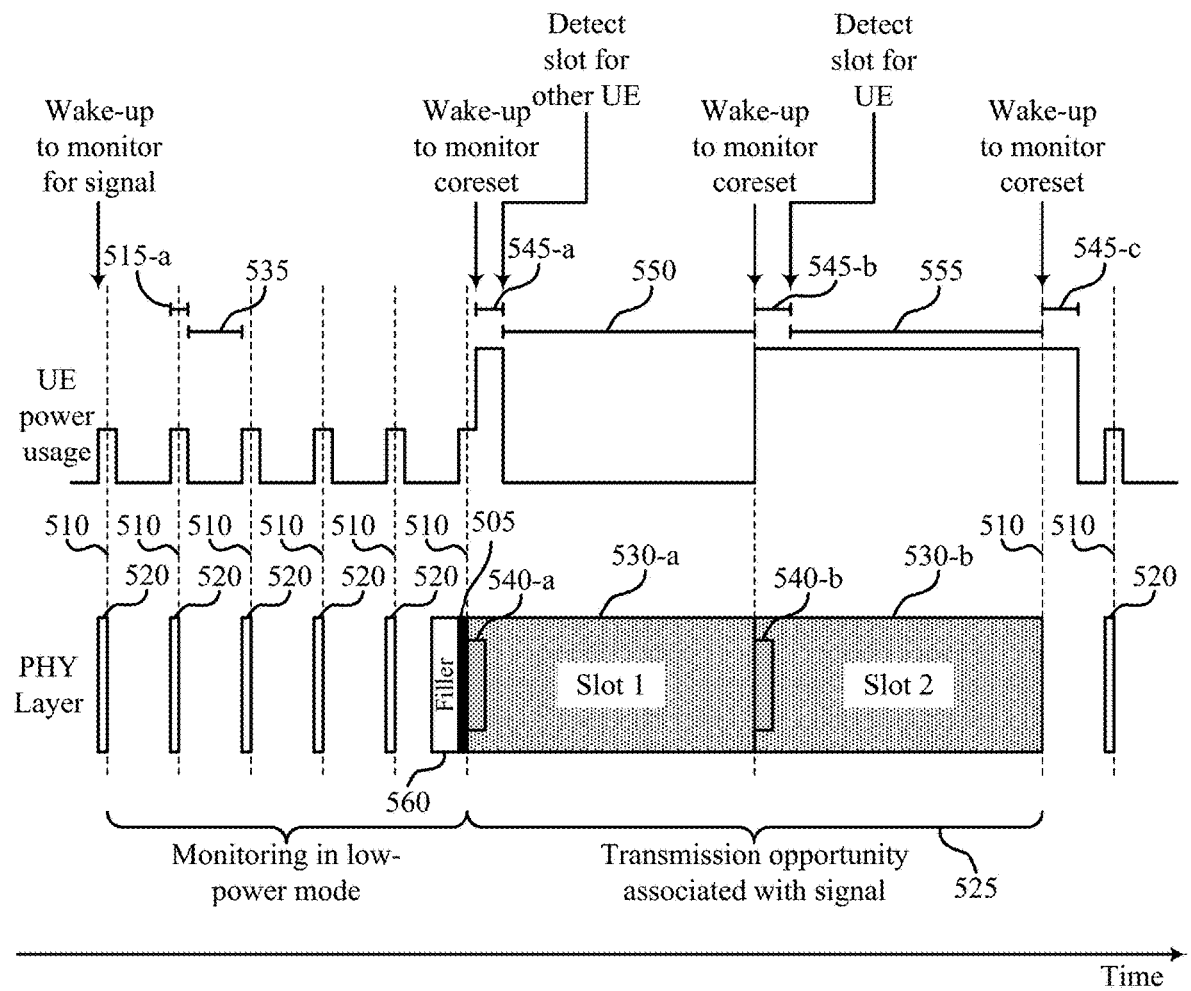
FIG. 5 illustrates an example of a timing diagram that supports a signal for a synchronized communication system operating in a shared spectrum frequency band in accordance with aspects of the present disclosure.

FIG. 5 illustrates an example of a timing diagram 500 that supports a signal for a synchronized communication system operating in a shared spectrum frequency band in accordance with various aspects of the present disclosure. In some examples, the timing diagram 500 may implement aspects of the wireless communications systems 100 and/or 200. The timing diagram 500 shows an example of how a signal cycle of a UE 115 in a sleep mode may operate in a synchronized wireless communication system using a shared radio frequency spectrum band. The example shown in the timing diagram 300 includes the use of a signal 505. The signal 505 may be an example of the signal 405 described with reference to FIG. 4.

The timing diagram 500 may illustrate UE power usage during a low-power mode and a depiction of what occurs at the PHY layer during the low-power mode. The UE 115 may enter a low-power mode before the timing diagram 500 begins. Before entering the low-power mode, the base station 105 and the UE 115 may coordinate parameters of the wake-up cycles and the transmission cycles during the low-power mode.

In the illustrated example, the UE 115 may monitor for the signal 505 at a plurality of potential slot start times 510 during a period 515. To monitor for the signal 505, the UE 115 may enter a second low-power mode different from the low-power mode and different from a fully-awake mode. The second low-power mode may be configured to allow the UE 115 to monitor for the signal 505, but may not include activating certain components that are not needed to detect the signal 505. The signal 505 may be transmitted before the potential slot start times 510. At each potential slot start time 510, there may be a potential signal location 520. As discussed with reference to FIG. 3, to avoid wasting communication resources of a transmission opportunity 525, the base station 105 and the UE 115 may be configured to start a slot 530 at a plurality of locations. In some cases, the UE 115 monitors a potential signal location 520 at a plurality of potential slot start times 510 (e.g., two, three, four, five, six, seven, eight, nine, ten, eleven, twelve, thirteen, fourteen, etc.).

The period 515 may indicate an amount of time the UE 115 is awake during the low-power mode (e.g., in the second low-power mode) to monitor a potential signal location 520. At a potential slot start time 510 (or at a beginning of a potential signal location 520), the UE 115 may wake-up to monitor for the signal 505 (e.g., enter the second low-power mode). Entering the second low-power mode may include activating a radio and/or other supporting components (e.g., decoding components) for detecting the signal 505 such that the radio and/or other supporting components go from a low-power state to a high-power state. The first portion of the period 515 may be used to receive or attempt to receive a signal 505 and a second portion of the period 515 may be used to decode or attempt to decode the signal 505. In some cases, the signal 505 may be a wideband waveform and the UE 115 may activate only a portion of components of the radio (or a set of different components that use less power) to attempt to decode the signal 505. If a signal 505 is not detected at a potential signal location 520, the UE 115 may enter or reenter the low-power mode for a period 535 until the next potential slot start time 510 or the next potential signal location 520. In some cases, the period 535 may be referred to as a microsleep. The functions performed during periods 515 and 535 may be repeated each time the UE 115 monitors a potential signal location 520.

In some cases, the UE 115 may detect the signal 505. The UE 115 may determine that a transmission opportunity 525 having one or more slots 530 has been granted to a base station 105 (e.g., scheduling entity) of the synchronized wireless communication system operating in the shared frequency spectrum band. Upon detecting the signal 505, the UE 115 may wake-up additional components to monitor for a coreset 540 associated with a slot 530 of the transmission opportunity 525 at period 545 (e.g., enter a fully-awake mode or a mode that consumes higher power than the low-power mode or the second low-power mode). Because the signal 505 may be a simpler signal than the coreset 540 (e.g., single waveform v. OFDM waveform), the UE 115 may activate less components or different (lower-power) components to detect and decode the signal 505 than are used to detect/decode the coreset 540. When the UE 115 detects a signal, the UE 115 may activate the additional components (or different higher-power components, as the case may be) to detect/decode the OFDM waveforms such as the coreset 540. In some cases, the UE 115 may monitor for coresets 540 (or monitor potential coreset locations) based on receiving and/or decoding the signal 505. Until the signal 505 is successfully decoded, the UE 115 may refrain from monitoring for coresets 540 while in a low-power mode. In some cases, the UE 115 may UE 115 may use the same components to detect the signal 505 and to decode the coreset 540, but the UE 115 may use different procedures to perform these functions. The UE 115 may use a first procedure to detect the signal 505 and may use a second procedure to decode the coreset 540.

The transmission opportunity 525 may include more than one slot 530 (e.g., a first slot 530-a and a second slot 530-b). The communication resources of the transmission opportunity 525 may be allocated by a base station 105 (e.g., scheduling entity of the synchronized wireless communication system) to any UE 115 coupled with the base station 105. The signal 505 may be broadcast by the base station 105 to all of its connected UEs. Not all of the slots 530 of the transmission opportunity 525 may be allocated to the UE 115. Some or all of the slots 530 may be allocated to other UEs. For example, after detecting and/or successfully decoding a coreset 540, the UE 115 may determine whether its associated slot 530 is intended for use (either uplink or downlink) by the UE 115. In some cases, the coreset 540 may be an example of resource grant that allocates at least a portion of resources of the associated slot 530 to a UE 115 to use to transmit information to the base station 105. In such cases, the coreset 540 may indicate the UE assigned the resources and what resources are assigned. In some cases, the coreset 540 may be an example of a downlink communication from the base station 105 to the UE 115. In such cases, the coreset 540 may indicate what UE is the intended recipient of the downlink communication.

In an example, after decoding the first coreset 540-a associated with the first slot 530-a, the UE 115 may determine that the first slot 530-a is intended for use by a UE different from the UE 115. In such a situation, the UE 115 may deactivate one or more of its components and enter a low-power mode for a period 550. Because the UE 115 knows that the information is being communicated during the first slot 530-a, the UE 115 may refrain from monitoring potential signal locations 520 during the period 550 (i.e., during the duration of the first slot 530-a). The functions performed during period 550 may be repeated each time the UE 115 goes to sleep during a slot 530 based on the contents of the coreset 540 associated with that slot 530.

In another example, after decoding the second coreset 540-b associated with the second slot 530-b, the UE 115 may determine that the second slot 530-b is intended for use by the UE 115. In such a situation, the UE 115 may remain awake for a period 555 and use the second slot 530-b for either uplink or downlink communications based on what was signaled in the second coreset 540-b. After the period 555 has expired (i.e., after the duration of the second slot 530-b is complete), the UE 115 may monitor potential coreset location immediately after the transmission opportunity 525. Because the UE 115 may be communicating during a first transmission opportunity that precedes a second transmission opportunity, the UE 115 may not receive a signal transmitted by the base station 105. In some cases, the base station 105 may not transmit a signal 505 for a second transmission opportunity that immediately follows another transmission opportunity. This may be the case because the base station 105 and its connected UEs may already be configured to monitor for coresets 540.

The transmission opportunity 525 may include any number of slots 530 and any number of those slots 530 may be allocated to any of the UEs 115 connected to the base station 105. In some cases, the signal may indicate a length of the transmission opportunity (e.g., in terms of slots or duration). In some cases, the UE 115 may be configured to monitor potential coreset locations until a threshold is satisfied based on receiving the signal 505. In such cases, the threshold may be based on a predetermined maximum length of a transmission opportunities.

In some cases, the UE 115 may monitor potential coreset locations until a certain number of the coreset locations are undecodable. During the transmission opportunity 525, the base station 105 may transmit coresets 540 with each slot that are decodable by the UE 115. Once the transmission opportunity 525 is finished, the base station 105 will stop transmitting slots 530 and coresets 540. Instead, another entity may be using the radio frequency spectrum band. Even if the slots 530 are not for the UE 115, the UE 115 will still be able to decode the coresets 540 and determine they are from the base station 105 during the transmission opportunity 525. The UE 115 may determine that the transmission opportunity 525 has concluded based on the number of coresets 540 failing to be decoded at a potential coreset location. Once the UE 115 has determined that the transmission opportunity 525 has concluded, the UE 115 may return to monitoring for the signal 505. A threshold of failed coreset decoding attempts used by the UE 115 to determine the transmission opportunity 525 is done may be one, two, three, four, five, six, seven, eight, nine, ten, eleven, twelve, thirteen, fourteen, etc.

In some cases, the signal 505 may be transmitted as part of a filler signal 560 transmitted by the base station 105. The filler signal 560 may be transmitted by a base station 105 during a clear channel assessment period of a LBT procedure. When the base station 105 is contending for access to the shared radio frequency spectrum for its network of UEs 115, the base station 105 may execute a LBT procedure, or some other type of contention-based protocol, to request and/or obtain a transmission opportunity. The base station 105 may transmit a signal (sometimes a noise-based signal) during a clear channel assessment period of the LBT procedure to indicate to other entities using the shared radio frequency spectrum that the next transmission opportunity is being used by the base station 105. In some cases, the signal 505 may be a part of the filler signal 560 transmitted by the base station 105 before the transmission opportunity 525. In some cases, the filler signal 560 may include repetitions of the signal 505. In such cases, the one or more signals 505 may be transmitted during the clear channel assessment period of the LBT procedure. In some cases, the signal 505 may be transmitted after the filler signal 560. In some cases, the signal 505 may be transmitted after a clear channel assessment period.

Figure 6:
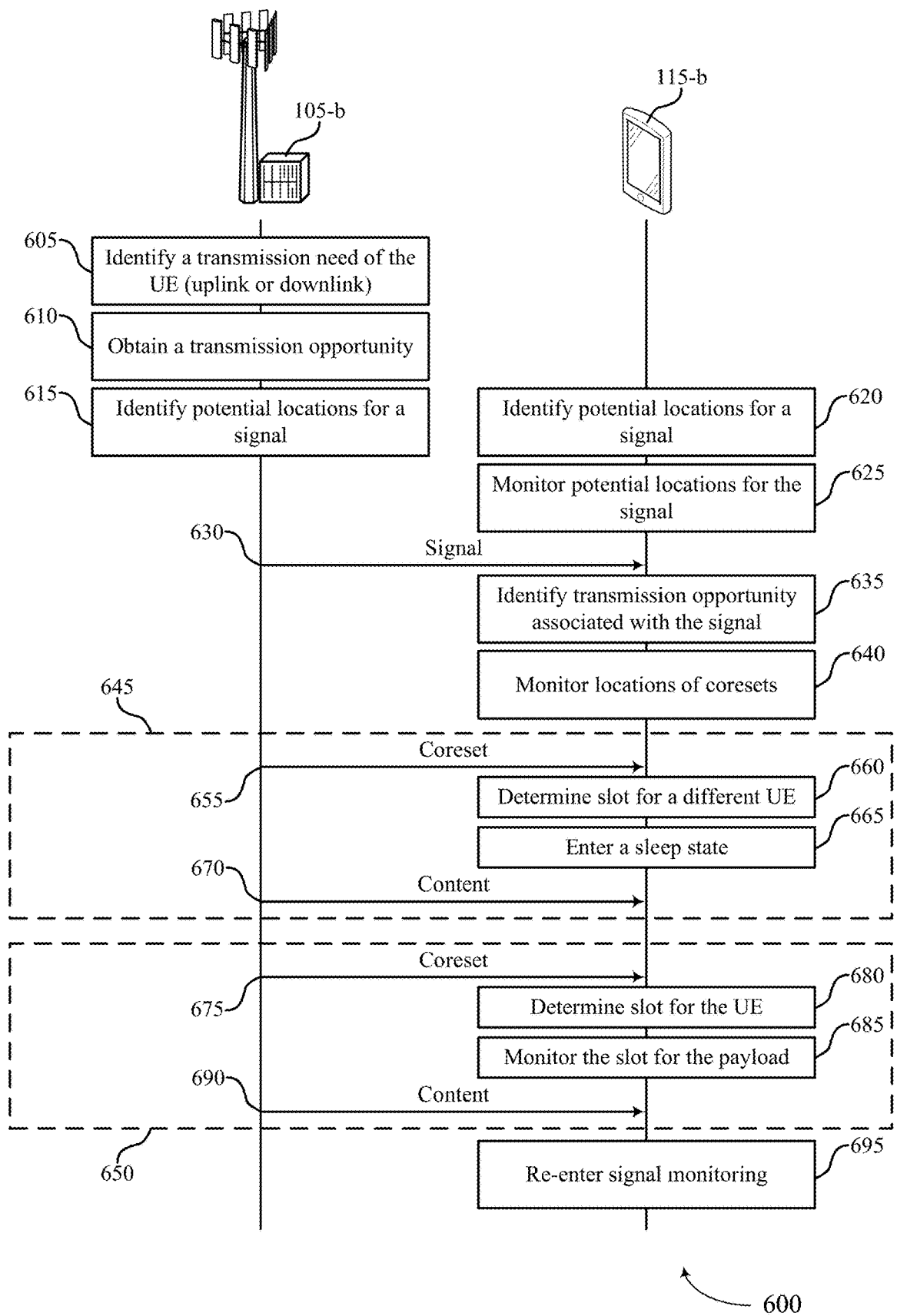
FIG. 6 illustrates an example of a communication scheme that supports a signal for a synchronized communication system operating in a shared spectrum frequency band in accordance with aspects of the present disclosure.

FIG. 6 illustrates an example of a communication scheme 600 that supports a signal for a synchronized communication system operating in a shared spectrum frequency band in accordance with various aspects of the present disclosure. In some examples, the communication scheme 600 may implement aspects of the wireless communications systems 100 and/or 200. The communication scheme 600 illustrates functions and communications of a base station 105-b and a UE 115-b when the UE 115-b is in a low-power mode. The base station 105-b and the UE 115-b may be part of a synchronized wireless communication system that operates in a shared radio frequency spectrum band. The communication scheme 600 may begin after the UE 115-b has entered a low-power mode and after the base station 105-b and the UE 115-b have already set the parameters for wake-up cycles during the low-power mode.

At block 605, the base station 105-b may identify a transmission need of the UE 115-b, either uplink or downlink. The base station 105-b may identify information buffered at the base station 105-b for deliver to the UE 115-b (e.g., downlink). The base station 105-b may identify communication resources for the UE 115-b to use in an uplink transmission based on a scheduling request received earlier or some other condition that is satisfied.

At block 610, the base station 105-b may obtain a transmission opportunity of the shared radio frequency spectrum to use for communications between the base station 105-b and the UE 115-b and/or other UEs 115 coupled with the base station 105-b. In some cases, the base station 105-b may execute a contention-based protocol (e.g., LBT procedure) to contend for access to the shared radio frequency spectrum band with other entities.

At block 615, the base station 105-b may identify one or more potential locations to transmit a signal based on being granted a transmission opportunity. The potential locations to transmit a signal may occur multiple times (e.g., two, three, four, five, six, seven, eight) during a signal slot duration. The base station 105-b may determine the one or more potential locations based on a known slot duration, a number of potential locations per slot duration (e.g., one, two, three, four), a slot boundary, or a combination thereof. For example, the base station 105-b, may identify a slot boundary known to both the base station 105-b and the UE 115-b. The known slot boundary may be an example of a time synchronization between the base station 105-b and the UE 115-b during the low-power mode. Using the known slot boundary, a known slot duration, and a predetermined number of potential locations during any given slot duration, the base station 105-b may determine one or more potential locations to transmit the signal. The base station 105-b may identify a downlink transmission starting opportunity. The downlink transmission starting opportunity may be positionable at a slot boundary or at a plurality of locations in a middle of a slot. The base station may transmit the signal before at least one of the downlink transmission starting opportunities.

At block 620, the UE 115-b may identify one or more potential locations for monitoring for a signal. The UE 115-b may execute the same or similar procedures as the base station 105-b to make this determination. At block 625, the UE 115-b may monitor the one or more potential locations for signals. The UE 115-b may activate its wake-up components to listen for and/or decode a signal at the potential locations for the signal. If no signal is detected, the UE 115-b may deactivate those components again (e.g., go back to sleep). In some cases, the UE 115-b may identify a plurality of downlink transmission starting opportunities. The downlink transmission starting opportunities may be positionable at a slot boundary and in one or more locations in the middle of a slot. The UE 115-b may monitor for the signal before each of the plurality of downlink transmission starting opportunities.

The base station 105-b may transmit a signal 630 to the UE 115-b based on obtaining the transmission opportunity. The signal 630 may be broadcast to a plurality of UEs coupled with the base station 105-b. In such cases, the signal 630 may be received by some or all of the UEs. The UEs that receive the signal 630 may wake-up to and monitor the coreset to determine whether a portion of the upcoming transmission opportunity includes resources allocated to themselves. If no portion of the upcoming transmission opportunity is for the UE 115-b, the UE 115-b may go back to sleep during the remaining duration of the transmission opportunity. In effect, the signal 630 may be configured to indicate to the UEs that the shared spectrum frequency band is entering a time when it will be used for the wireless communication system associated with the UEs. The signal 630 may be an example of the signals 405 and 505 described with references to FIGS. 4 and 5.

At block 635, the UE 115-b may identify a transmission opportunity associated with the signal 630. In some cases, this may include decoding information included in the signal 630. In some cases, the signal 630 may not include any dynamically-configurable information, and the UE 115-b may begin its coreset monitoring.

At block 640, the UE 115-*b* may monitor one or more potential locations of coresets based on receiving the signal 630. The UE 115-*b* may activate its normal transceiver components to receive and/or decode the coresets. As part of this, the UE 115-*b* may identify one or more potential locations of the coresets based on the arrival time of the signal 630 and the slot structure. If no coresets are detected, the UE 115-*b* may cease its coreset monitoring and return to monitoring for signals 630.

If a coreset is detected, one of at least two scenarios may occur for the UE 115-*b*. In a first scenario 645, the UE 115-*b* may, at block 660, determine the slot associated with a detected coreset 655 is for a different UE connected to the base station 105-*b*, and, at block 665, the UE 115-*b* may enter a low-power mode again. In some cases, the UE 115-*b* may not be configured to identify the other UE, but may be configured to determine that the slot is addressed to a UE other than the current UE 115-*a*. In the first scenario 645, the content 670 of the slot is not received by the UE 115-*b* because the UE 115-*b* is not listening for it. In a second scenario 650, the UE 115-*b* may, at block 680, determine the slot associated with the detected coreset 675 is for the UE 115-*b* and, at block 685, the UE 115-*b* may monitor the slot for the content 690. A transmission opportunity may include any number of first scenario 645 or any number of the second scenario 650. In some cases, other scenarios may occur during a transmission opportunity. The scenarios 645, 650 may be examples of processes and procedures described with reference to the timing diagram 500 of FIG. 5.

At block 695, the UE 115-*b* may re-enter signal monitoring. Upon determining that the transmission opportunity has concluded, the UE 115-*b* may cease monitoring for coresets, which takes a relatively larger amount of power, and begin monitoring for signals 630, which takes a relatively smaller amount of power. The UE 115-*b* may determine that the transmission opportunity has concluded using a variety of procedures. In some cases, the signal may indicate a length of the transmission opportunity (e.g., in terms of slots or duration). In some cases, the UE 115-*b* may be configured to monitor potential coreset locations until a threshold is satisfied based on receiving the signal 630. In such cases, the threshold may be based on a predetermined maximum length of a transmission opportunities. In some cases, the UE 115-*b* may determine that the transmission opportunity has concluded based on the number of coresets failing to be decoded at potential coreset locations. A threshold of failed coreset decoding attempts used by the UE 115-*b* to determine the transmission opportunity is done may be one, two, three, four, five, six, seven, eight, nine, ten, eleven, twelve, thirteen, fourteen, etc.

Figure 7:
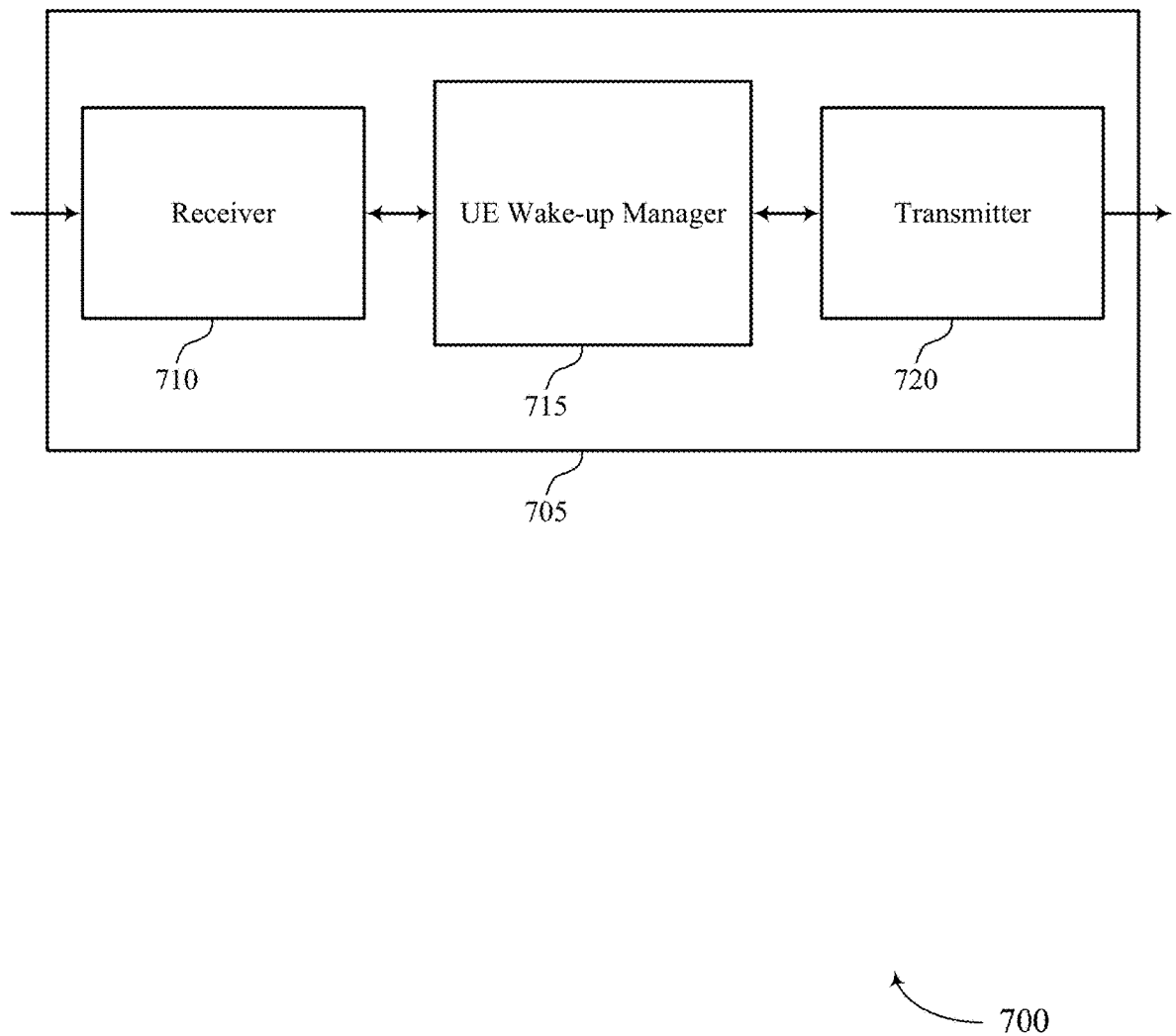
FIGS. 7 through 9 show block diagrams of a device that supports a signal for a synchronized communication system operating in a shared spectrum frequency band in accordance with aspects of the present disclosure.

FIG. 7 shows a block diagram 700 of a wireless device 705 that supports a signal for a synchronized communication system operating in a shared spectrum frequency band in accordance with aspects of the present disclosure. Wireless device 705 may be an example of aspects of a user equipment (UE) 115 as described herein. Wireless device 705 may include receiver 710, UE wake-up manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to a signal for a synchronized communication system operating in a shared spectrum frequency band, etc.). Information may be passed on to other components of the device. The receiver 710 may be an example of aspects of the transceiver 1035 described with reference to FIG. 10. The receiver 710 may utilize a single antenna or a set of antennas.

UE wake-up manager 715 may be an example of aspects of the UE wake-up manager 1015 described with reference to FIG. 10. UE wake-up manager 715 and/or at least some of its various sub-components may be implemented in hardware, software executed by a processor, firmware, or any combination thereof. If implemented in software executed by a processor, the functions of the UE wake-up manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE wake-up manager 715 and/or at least some of its various sub-components may be physically located at various positions, including being distributed such that portions of functions are implemented at different physical locations by one or more physical devices. In some examples, UE wake-up manager 715 and/or at least some of its various sub-components may be a separate and distinct component in accordance with various aspects of the present disclosure. In other examples, UE wake-up manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE wake-up manager 715 may perform, in a synchronized communication system operating in a shared spectrum frequency band, discontinuous monitoring of a set of potential locations for a signal, receive the signal in one of the set of potential locations, remain awake, based on receiving the signal, to process a control resource set associated with a downlink transmission opportunity, determine that a content of the downlink transmission opportunity will include content for the UE based on processing the control resource set, and monitor at least a portion of the downlink transmission opportunity based on determining that the content includes the content for the UE. In some cases, the UE wake-up manager 715 may perform functions similar to the functions of blocks 620-695 described with reference to FIG. 6.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
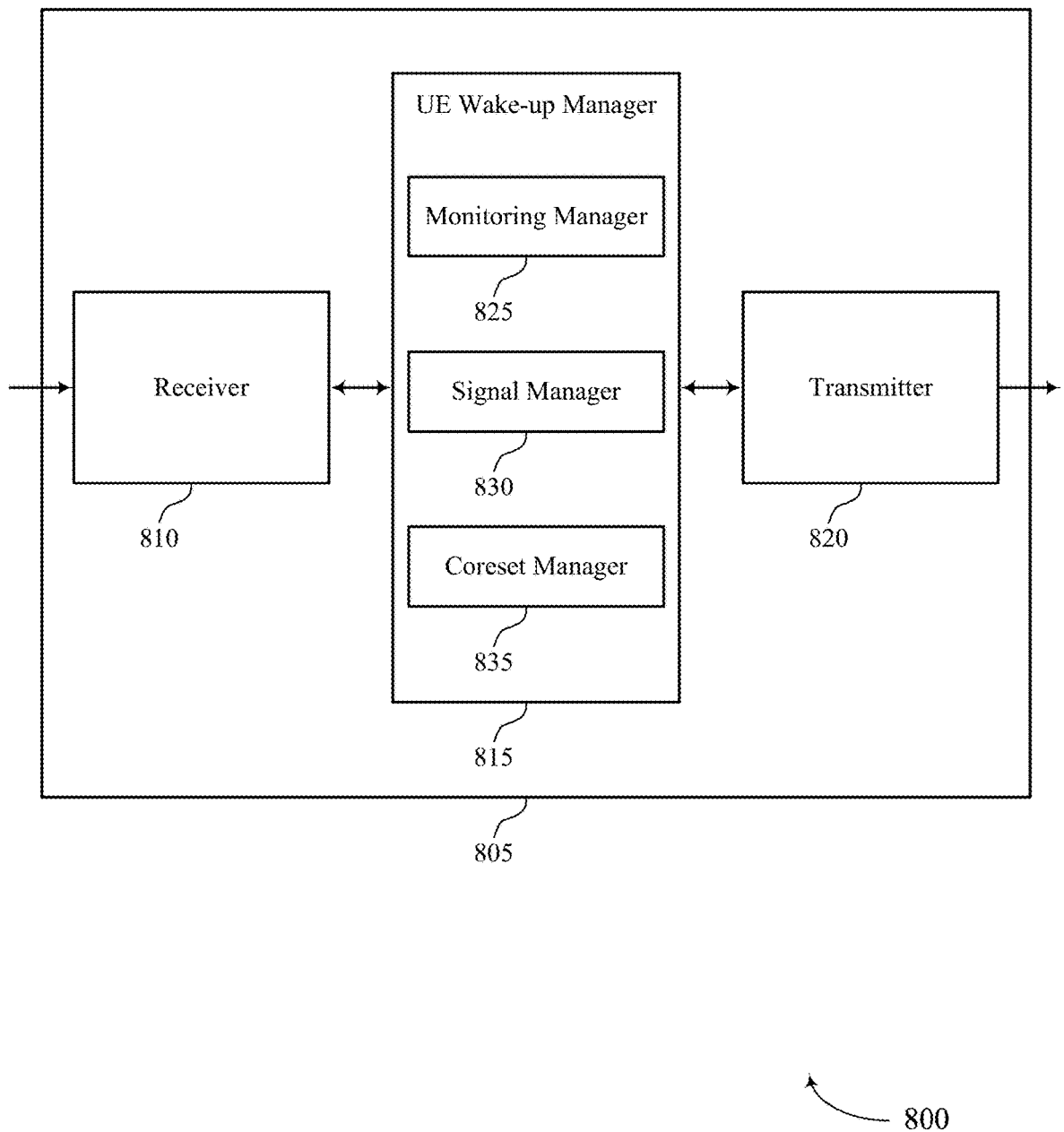

FIG. 8 shows a block diagram 800 of a wireless device 805 that supports a signal for a synchronized communication system operating in a shared spectrum frequency band in accordance with aspects of the present disclosure. Wireless device 805 may be an example of aspects of a wireless device 705 or a UE 115 as described with reference to FIG. 7. Wireless device 805 may include receiver 810, UE wake-up manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to a signal for a synchronized communication system operating in a shared spectrum frequency band, etc.). Information may be passed on to other components of the device. The receiver 810 may be an example of aspects of the transceiver 1035 described with reference to FIG. 10. The receiver 810 may utilize a single antenna or a set of antennas.

UE wake-up manager 815 may be an example of aspects of the UE wake-up manager 1015 described with reference to FIG. 10. UE wake-up manager 815 may also include monitoring manager 825, signal manager 830, and coreset manager 835.

Monitoring manager 825 may perform, in a synchronized communication system operating in a shared spectrum frequency band, discontinuous monitoring of a set of potential locations for a signal, monitor at least a portion of the downlink transmission opportunity based on determining that the content includes the content for the UE, and monitor for a next configured control resource set based on entering the sleep state. In some cases, the monitoring manager 825 may perform functions similar to the functions of blocks 620-625 described with reference to FIG. 6.

Signal manager 830 may receive the signal in one of the set of potential locations. In some cases, the signal is a single waveform detectable using an autocorrelation function. In some cases, the signal is a wide-band waveform including one or more repetitions of a short sequence. In some cases, the signal is a channel reservation preamble used to reserve channels for other nodes. In some cases, the signal is detected using a first procedure that is different from a second procedure configured to decode the control resource set. In some cases, the first procedure consumes less power when detecting the signal than the second procedure when detecting the signal. In some cases, the signal may be transmitted after a clear channel assessment period of a listen-before-talk procedure of the shared spectrum frequency band. In some cases, the signal manager 830 may perform functions similar to the functions of blocks 630-635 described with reference to FIG. 6.

Coreset manager 835 may remain awake, based on receiving the signal, to process a control resource set associated with a downlink transmission opportunity, determine that a content of the downlink transmission opportunity will include content for the UE based on processing the control resource set, and remain awake further includes activating one or more additional circuits to process the control resource set. In some cases, the coreset manager 835 may perform functions similar to the functions of blocks 635-660 and 675-680 described with reference to FIG. 6.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
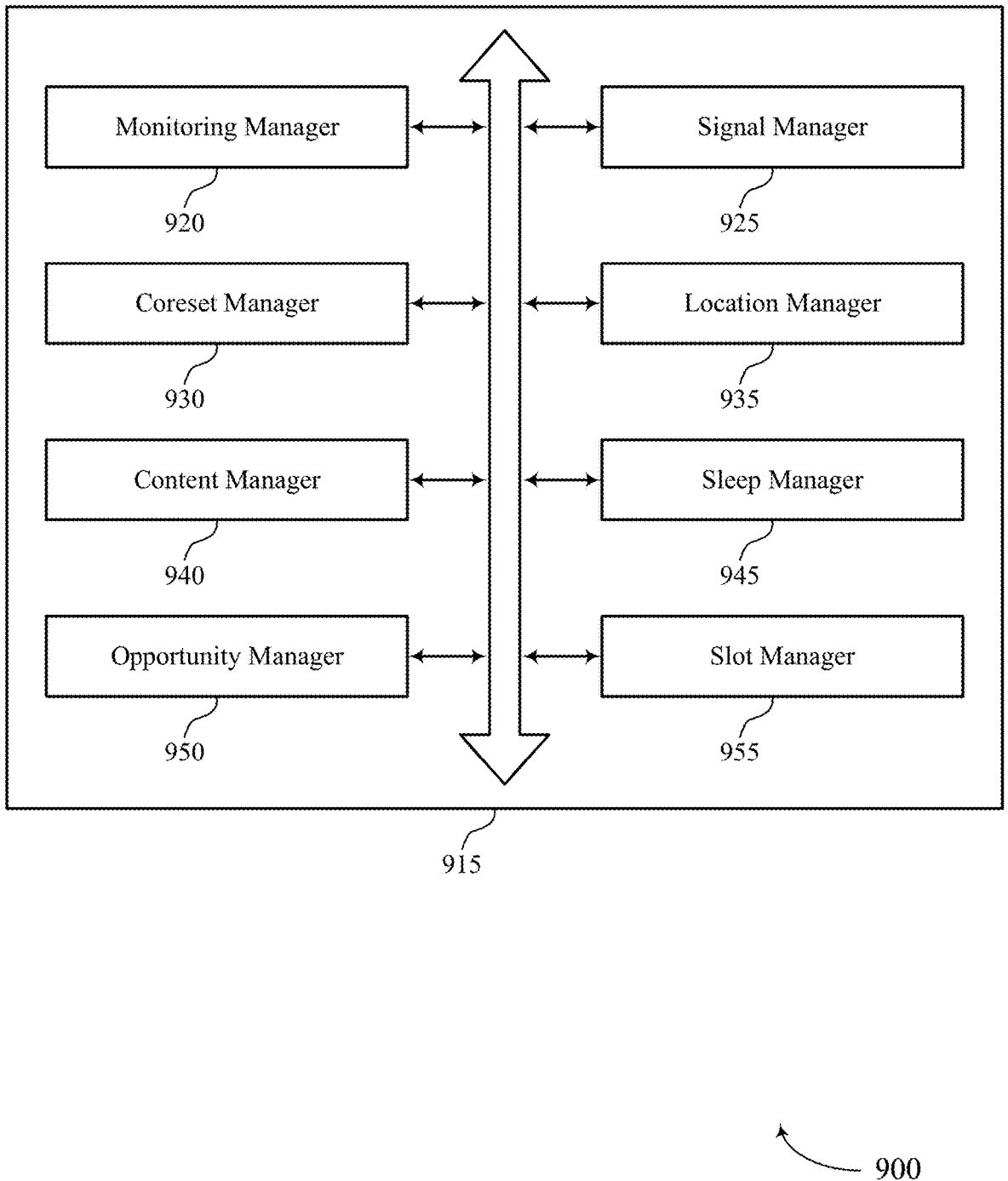

FIG. 9 shows a block diagram 900 of a UE wake-up manager 915 that supports a signal for a synchronized communication system operating in a shared spectrum frequency band in accordance with aspects of the present disclosure. The UE wake-up manager 915 may be an example of aspects of a UE wake-up manager 715, a UE wake-up manager 815, or a UE wake-up manager 1015 described with reference to FIGS. 7, 8, and 10. The UE wake-up manager 915 may include monitoring manager 920, signal manager 925, coreset manager 930, location manager 935, content manager 940, sleep manager 945, opportunity manager 950, and slot manager 955. Each of these modules may communicate, directly or indirectly, with one another (e.g., via one or more buses).

Monitoring manager 920 may perform, in a synchronized communication system operating in a shared spectrum frequency band, discontinuous monitoring of a set of potential locations for a signal, monitor at least a portion of the downlink transmission opportunity based on determining that the content includes the content for the UE, and monitor for a next configured control resource set based on entering the sleep state. In some cases, the monitoring manager 920 may perform functions similar to the functions of blocks 620-625 described with reference to FIG. 6.

Signal manager 925 may receive the signal in one of the set of potential locations. In some cases, the signal is a single waveform detectable using an autocorrelation function. In some cases, the signal is a wide-band waveform including one or more repetitions of a short sequence. In some cases, the signal is a channel reservation preamble used to reserve channels for other nodes. In some cases, the signal is detected using a first procedure that is different from a second procedure configured to decode the control resource set. In some cases, the first procedure consumes less power when detecting the signal than the second procedure when detecting the signal. In some cases, the signal may be transmitted after a clear channel assessment period of a listen-before-talk procedure of the shared spectrum frequency band. In some cases, the signal manager 925 may perform functions similar to the functions of blocks 630-635 described with reference to FIG. 6.

Coreset manager 930 may remain awake, based on receiving the signal, to process a control resource set associated with a downlink transmission opportunity, determine that a content of the downlink transmission opportunity will include content for the UE based on processing the control resource set, and remain awake further includes activating one or more additional circuits to process the control resource set. In some cases, the coreset manager 930 may perform functions similar to the functions of blocks 635-660 and 675-680 described with reference to FIG. 6.

Location manager 935 may determine potential locations for slot boundaries, slot start times, transmission opportunity start times, signal locations, coreset locations, or a combination thereof. In some cases, the set of potential locations includes one or more potential locations within a second downlink transmission opportunity before the downlink transmission opportunity. In some cases, the location manager 935 may perform functions similar to the functions of blocks 635-640 described with reference to FIG. 6.

Content manager 940 may determine that a content of a slot of the downlink transmission opportunity does not includes information for the UE. In some cases, the content manager 940 may perform functions similar to the functions of blocks 655-670 described with reference to FIG. 6.

Sleep manager 945 may enter a sleep state for a duration of the slot based on determining that the information of the slot is not for the UE. In some cases, the sleep manager 945 may perform functions similar to the functions of blocks 655-670 described with reference to FIG. 6.

Opportunity manager 950 may identify a set of downlink transmission starting opportunities, where the set of downlink transmission starting opportunities are positionable at a slot boundary and in a middle of a slot and monitor for the signal before each of the set of downlink transmission starting opportunities, where receiving the signal is based on monitoring for the signal before each of the set of downlink transmission starting opportunities. In some cases, the opportunity manager 950 may perform functions similar to the functions of blocks 635-640 described with reference to FIG. 6.

Slot manager 955 may identify a set of slots of the downlink transmission opportunity based on receiving the signal and monitor at least a portion of each slot of the set of slots for the control resource set, where processing the control resource set is based on monitoring each slot of the set of slots for control resource sets. In some cases, the slot manager 955 may perform functions similar to the functions of blocks 635-690 described with reference to FIG. 6.

Figure 10:
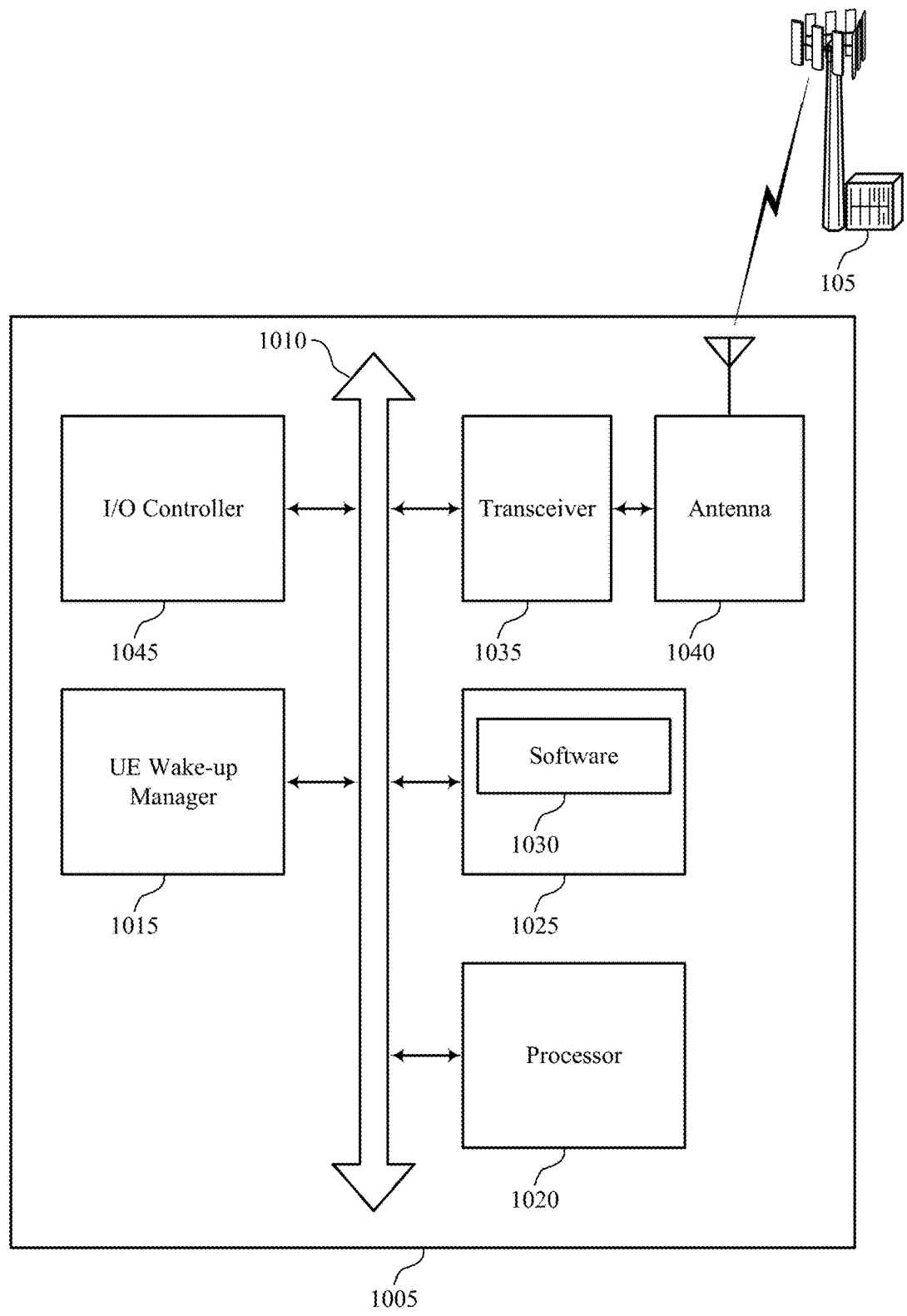
FIG. 10 illustrates a block diagram of a system including a UE that supports a signal for a synchronized communication system operating in a shared spectrum frequency band in accordance with aspects of the present disclosure.

FIG. 10 shows a diagram of a system 1000 including a device 1005 that supports a signal for a synchronized communication system operating in a shared spectrum frequency band in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE wake-up manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting a signal for a synchronized communication system operating in a shared spectrum frequency band).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support a signal for a synchronized communication system operating in a shared spectrum frequency band. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
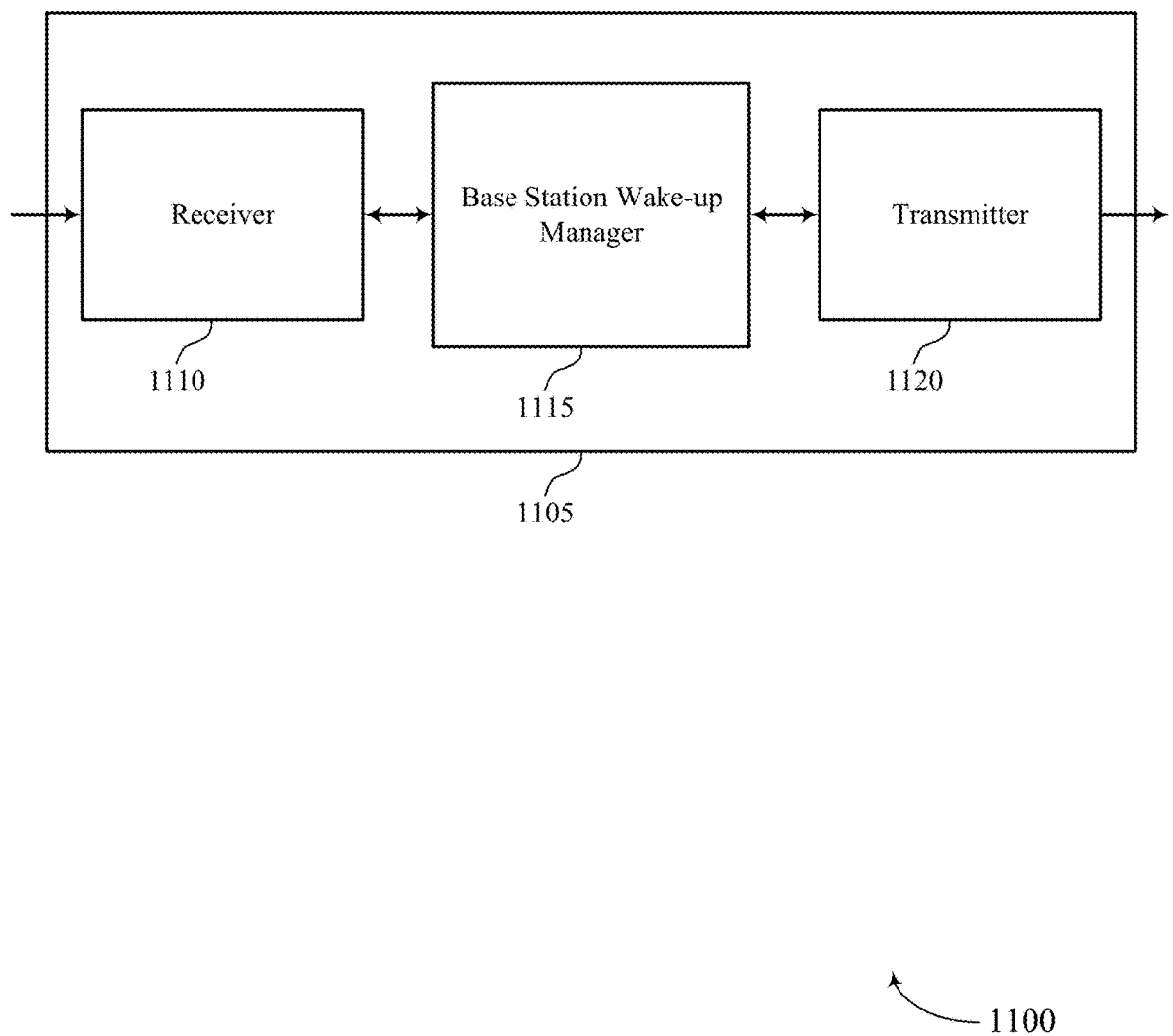
FIGS. 11 through 13 show block diagrams of a device that supports a signal for a synchronized communication system operating in a shared spectrum frequency band in accordance with aspects of the present disclosure.

FIG. 11 shows a block diagram 1100 of a wireless device 1105 that supports a signal for a synchronized communication system operating in a shared spectrum frequency band in accordance with aspects of the present disclosure. Wireless device 1105 may be an example of aspects of a base station 105 as described herein. Wireless device 1105 may include receiver 1110, base station wake-up manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to a signal for a synchronized communication system operating in a shared spectrum frequency band, etc.). Information may be passed on to other components of the device. The receiver 1110 may be an example of aspects of the transceiver 1435 described with reference to FIG. 14. The receiver 1110 may utilize a single antenna or a set of antennas.

Base station wake-up manager 1115 may be an example of aspects of the base station wake-up manager 1415 described with reference to FIG. 14. Base station wake-up manager 1115 and/or at least some of its various sub-components may be implemented in hardware, software executed by a processor, firmware, or any combination thereof. If implemented in software executed by a processor, the functions of the base station wake-up manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station wake-up manager 1115 and/or at least some of its various sub-components may be physically located at various positions, including being distributed such that portions of functions are implemented at different physical locations by one or more physical devices. In some examples, base station wake-up manager 1115 and/or at least some of its various sub-components may be a separate and distinct component in accordance with various aspects of the present disclosure. In other examples, base station wake-up manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station wake-up manager 1115 may identify information to be transmitted to a UE, identify a transmission opportunity to transmit the information to the UE using a synchronized communication system operating in a shared spectrum frequency band, transmit a signal at one of a set of potential locations before the transmission opportunity as part of a listen-before-talk (LBT) procedure, and transmit a downlink transmission burst including one or more slots based on transmitting the signal. In some cases, the base station wake-up manager 1115 may perform functions similar to the functions of blocks 605-615, 630, 655, 670, 675, 690 described with reference to FIG. 6.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
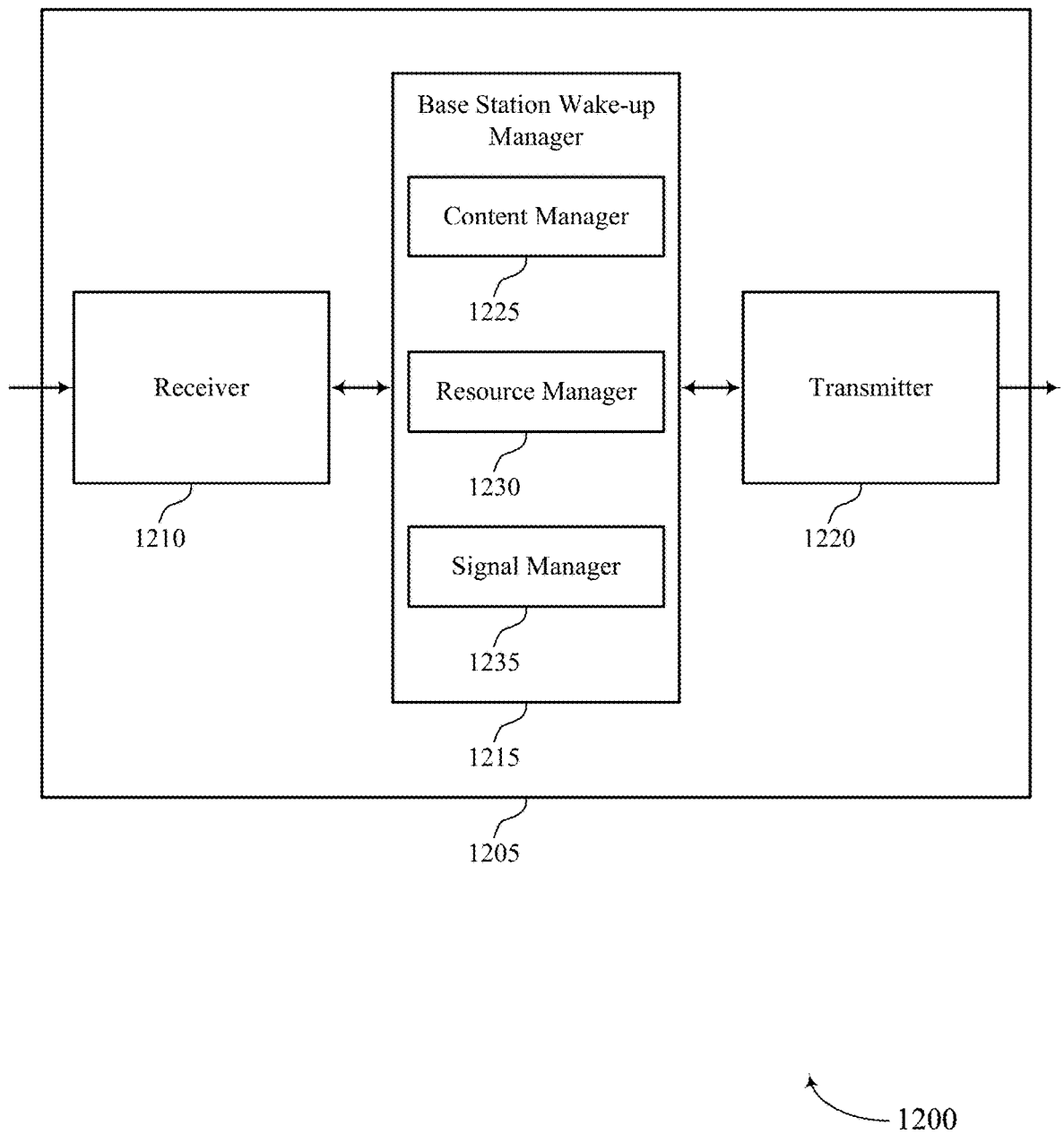

FIG. 12 shows a block diagram 1200 of a wireless device 1205 that supports a signal for a synchronized communication system operating in a shared spectrum frequency band in accordance with aspects of the present disclosure. Wireless device 1205 may be an example of aspects of a wireless device 1105 or a base station 105 as described with reference to FIG. 11. Wireless device 1205 may include receiver 1210, base station wake-up manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to a signal for a synchronized communication system operating in a shared spectrum frequency band, etc.). Information may be passed on to other components of the device. The receiver 1210 may be an example of aspects of the transceiver 1435 described with reference to FIG. 14. The receiver 1210 may utilize a single antenna or a set of antennas.

Base station wake-up manager 1215 may be an example of aspects of the base station wake-up manager 1415 described with reference to FIG. 14. Base station wake-up manager 1215 may also include content manager 1225, resource manager 1230, and signal manager 1235.

Content manager 1225 may identify information to be transmitted to a UE. Resource manager 1230 may identify a transmission opportunity to transmit the information to the UE using a synchronized communication system operating in a shared spectrum frequency band and transmit a downlink transmission burst including one or more slots based on transmitting the signal. In some cases, the content manager 1225 may perform functions similar to the functions of block 605 described with reference to FIG. 6.

Signal manager 1235 may transmit a signal at one of a set of potential locations before the transmission opportunity as part of a LBT procedure. In some cases, the signal is transmitted after a clear channel assessment period of the LBT procedure. In some cases, the signal is a single waveform detectable using an autocorrelation function. In some cases, the signal is at least a portion of a wide-band channel reservation preamble. In some cases, the signal manager 1235 may perform functions similar to the functions of blocks 605-615 and 630 described with reference to FIG. 6.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
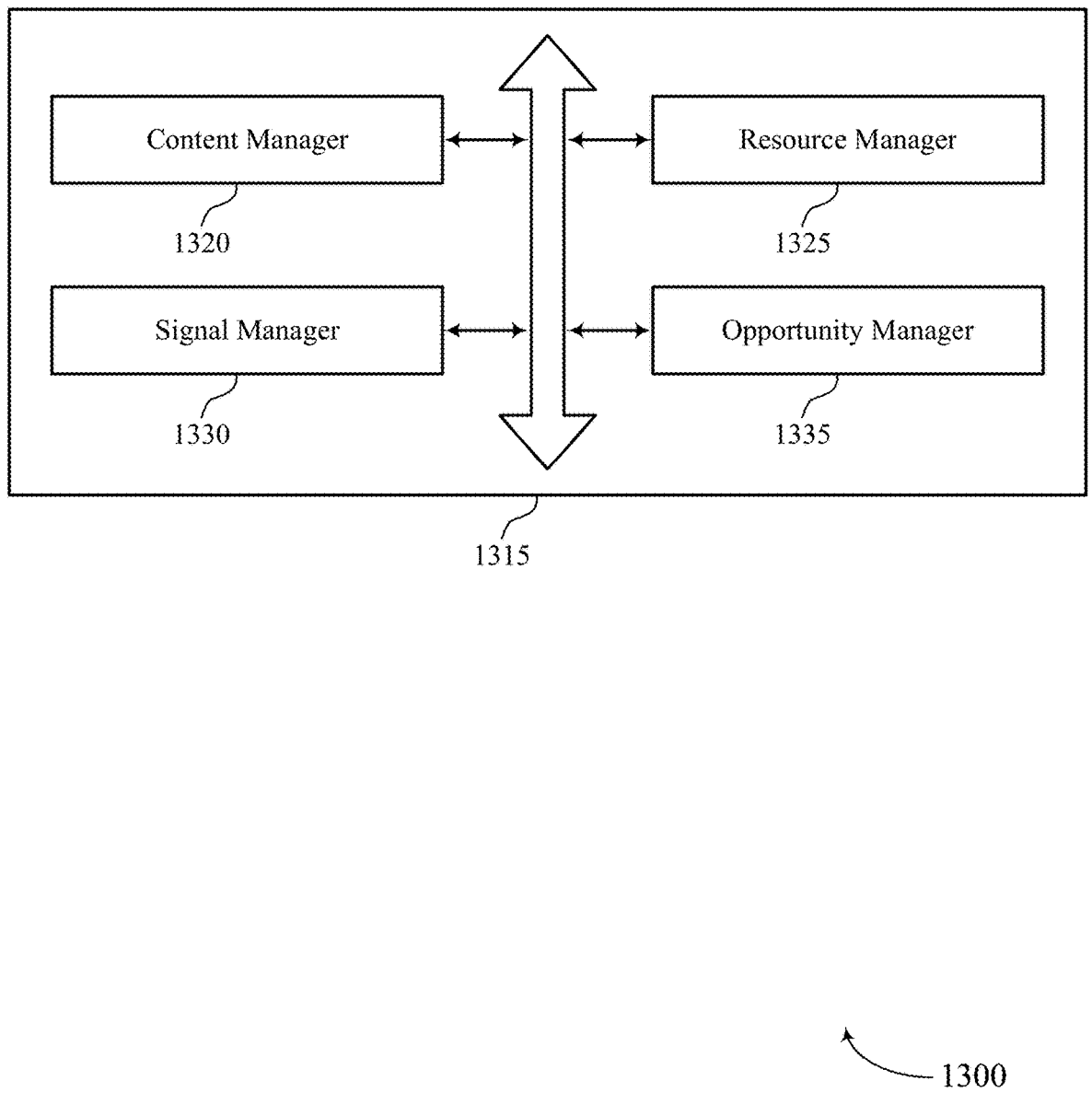

FIG. 13 shows a block diagram 1300 of a base station wake-up manager 1315 that supports a signal for a synchronized communication system operating in a shared spectrum frequency band in accordance with aspects of the present disclosure. The base station wake-up manager 1315 may be an example of aspects of a base station wake-up manager 1415 described with reference to FIGS. 11, 12, and 14. The base station wake-up manager 1315 may include content manager 1320, resource manager 1325, signal manager 1330, and opportunity manager 1335. Each of these modules may communicate, directly or indirectly, with one another (e.g., via one or more buses).

Content manager 1320 may identify information to be transmitted to a UE. Resource manager 1325 may identify a transmission opportunity to transmit the information to the UE using a synchronized communication system operating in a shared spectrum frequency band and transmit a downlink transmission burst including one or more slots based on transmitting the signal. In some cases, the content manager 1320 may perform functions similar to the functions of block 605 described with reference to FIG. 6.

Signal manager 1330 may transmit a signal at one of a set of potential locations before the transmission opportunity as part of a LBT procedure. In some cases, the signal is transmitted after a clear channel assessment period of the LBT procedure. In some cases, the signal is a single waveform detectable using an autocorrelation function. In some cases, the signal is at least a portion of a wide-band channel reservation preamble. In some cases, the signal manager 1330 may perform functions similar to the functions of blocks 605-615 and 630 described with reference to FIG. 6.

Opportunity manager 1335 may transmit the information to the UE during at least one slot of the transmission opportunity, transmit information for a second UE different from the UE during at least one slot of the transmission opportunity, and transmit the signal before the downlink transmission starting opportunity. In some cases, the downlink transmission starting opportunity is positionable at a slot boundary or in a middle of a slot. In some cases, the opportunity manager 1335 may perform functions similar to the functions of blocks 645-690 described with reference to FIG. 6.

Figure 14:
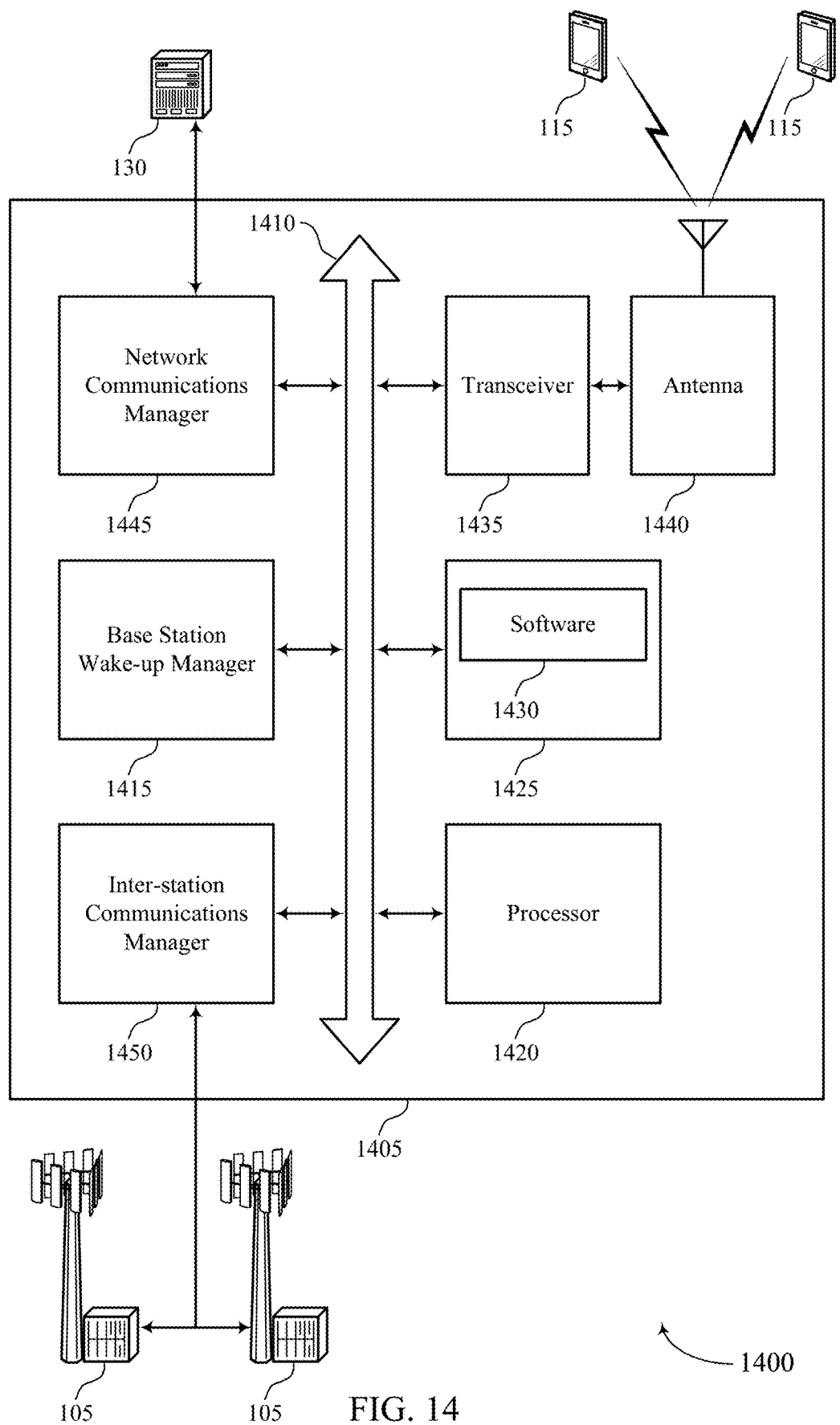
FIG. 14 illustrates a block diagram of a system including a base station that supports a signal for a synchronized communication system operating in a shared spectrum frequency band in accordance with aspects of the present disclosure.

FIG. 14 shows a diagram of a system 1400 including a device 1405 that supports a signal for a synchronized communication system operating in a shared spectrum frequency band in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station wake-up manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting a signal for a synchronized communication system operating in a shared spectrum frequency band).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support a signal for a synchronized communication system operating in a shared spectrum frequency band. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
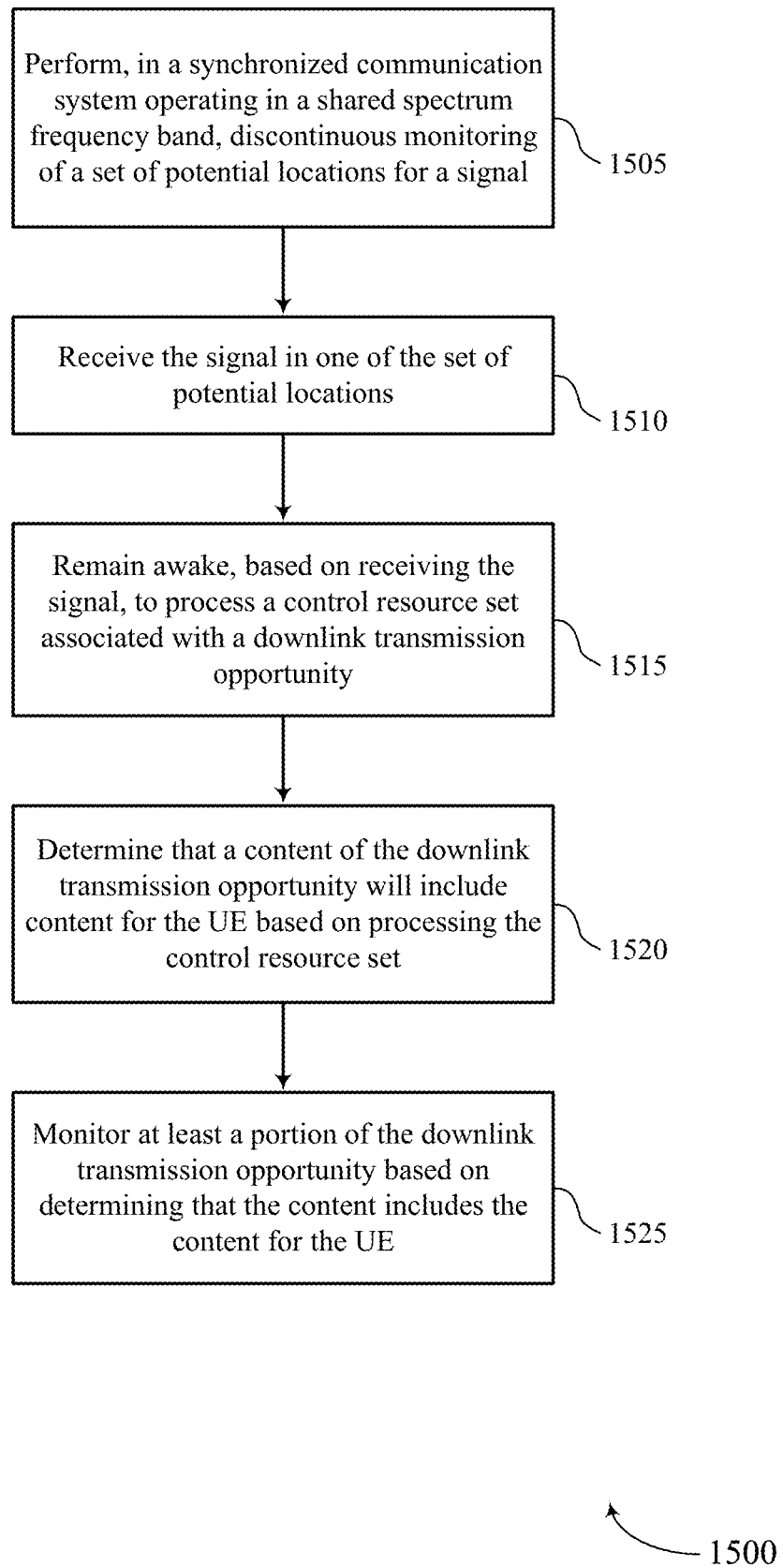
FIGS. 15 through 16 illustrate methods for a signal for a synchronized communication system operating in a shared spectrum frequency band in accordance with aspects of the present disclosure.

FIG. 15 shows a flowchart illustrating a method 1500 for a signal for a synchronized communication system operating in a shared spectrum frequency band in accordance with aspects of the present disclosure. The operations of method 1500 may be implemented by a UE 115 or its components as described herein. For example, the operations of method 1500 may be performed by a UE wake-up manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may perform, in a synchronized communication system operating in a shared spectrum frequency band, discontinuous monitoring of a plurality of potential locations for a signal. The operations of 1505 may be performed according to the methods described herein. In certain examples, aspects of the operations of 1505 may be performed by a monitoring manager as described with reference to FIGS. 7 through 10.

At 1510 the UE 115 may receive the signal in one of the plurality of potential locations. The operations of 1510 may be performed according to the methods described herein. In certain examples, aspects of the operations of 1510 may be performed by a signal manager as described with reference to FIGS. 7 through 10.

At 1515 the UE 115 may remain awake, based at least in part on receiving the signal, to process a control resource set associated with a downlink transmission opportunity. The operations of 1515 may be performed according to the methods described herein. In certain examples, aspects of the operations of 1515 may be performed by a coreset manager as described with reference to FIGS. 7 through 10.

At 1520 the UE 115 may determine that a content of the downlink transmission opportunity will include content for the UE based at least in part on processing the control resource set. The operations of 1520 may be performed according to the methods described herein. In certain examples, aspects of the operations of 1520 may be performed by a coreset manager as described with reference to FIGS. 7 through 10.

At 1525 the UE 115 may monitor at least a portion of the downlink transmission opportunity based at least in part on determining that the content includes the content for the UE. The operations of 1525 may be performed according to the methods described herein. In certain examples, aspects of the operations of 1525 may be performed by a monitoring manager as described with reference to FIGS. 7 through 10.

Figure 16:
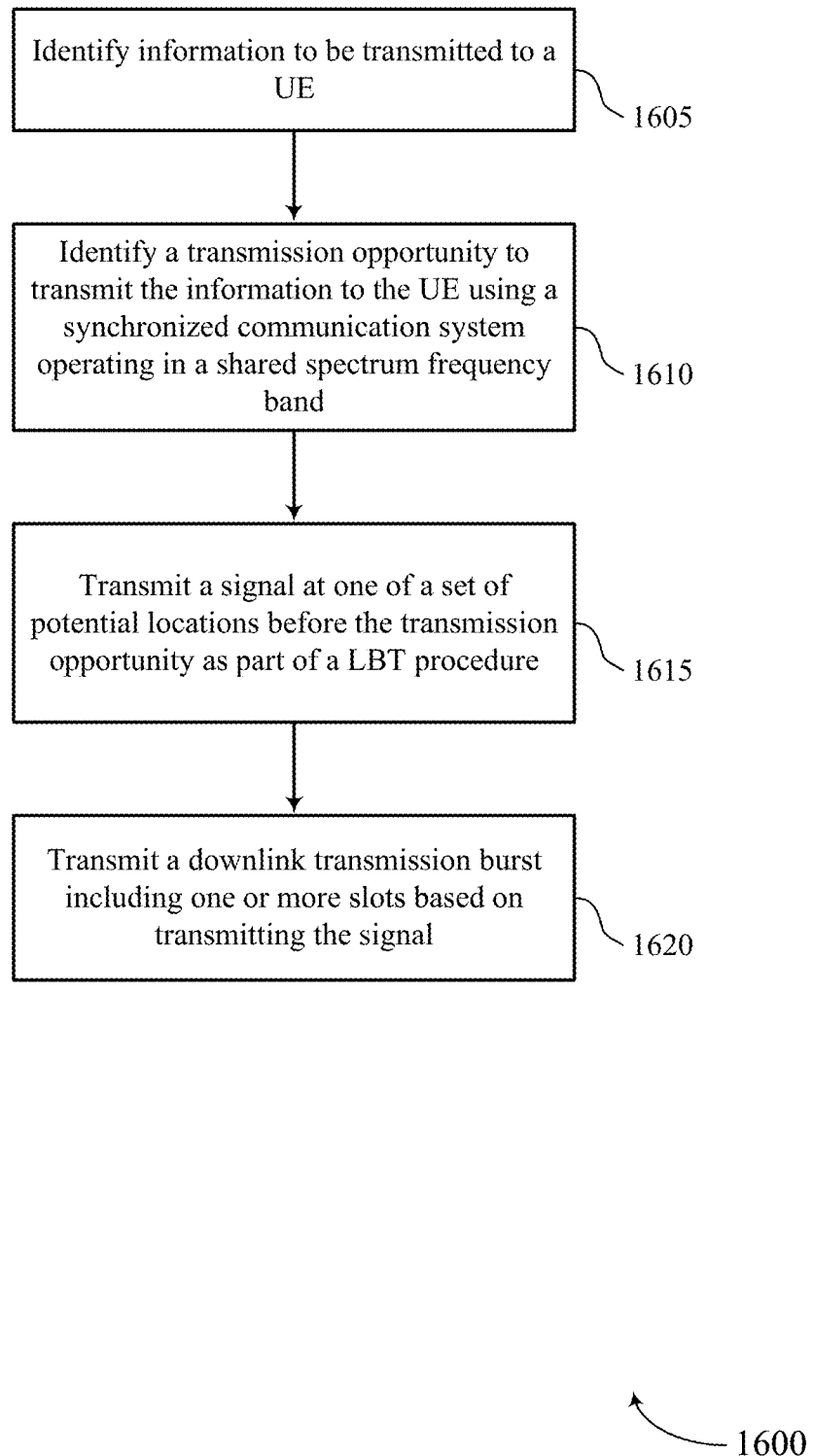

FIG. 16 shows a flowchart illustrating a method 1600 for a signal for a synchronized communication system operating in a shared spectrum frequency band in accordance with aspects of the present disclosure. The operations of method 1600 may be implemented by a base station 105 or its components as described herein. For example, the operations of method 1600 may be performed by a base station wake-up manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify information to be transmitted to a user equipment (UE). The operations of 1605 may be performed according to the methods described herein. In certain examples, aspects of the operations of 1605 may be performed by a content manager as described with reference to FIGS. 11 through 14.

At 1610 the base station 105 may identify a transmission opportunity to transmit the information to the UE using a synchronized communication system operating in a shared spectrum frequency band. The operations of 1610 may be performed according to the methods described herein. In certain examples, aspects of the operations of 1610 may be performed by a resource manager as described with reference to FIGS. 11 through 14.

At 1615 the base station 105 may transmit a signal at one of a plurality of potential locations before the transmission opportunity as part of a listen-before-talk (LBT) procedure. The operations of 1615 may be performed according to the methods described herein. In certain examples, aspects of the operations of 1615 may be performed by a signal manager as described with reference to FIGS. 11 through 14.

At 1620 the base station 105 may transmit a downlink transmission burst including one or more slots based at least in part on transmitting the signal. The operations of 1620 may be performed according to the methods described herein. In certain examples, aspects of the operations of 1620 may be performed by a resource manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    entering a first power mode of the UE in a synchronized communication system operating in a shared spectrum frequency band;
    performing, in a second power mode, discontinuous monitoring of a plurality of potential locations for a signal, wherein the second power mode is higher than the first power mode;
    receiving the signal in one of the plurality of potential locations;
    entering a third power mode, based at least in part on receiving the signal, to process a control resource set associated with a downlink transmission opportunity, wherein the third power mode is higher than the first power mode and the second power mode;
    determining that a content of the downlink transmission opportunity will include content for the UE based at least in part on processing the control resource set; and
    monitoring at least a portion of the downlink transmission opportunity based at least in part on determining that the content includes the content for the UE.

2. The method of claim 1, wherein entering the third power mode further comprises activating one or more additional circuits to process the control resource set.

3. The method of claim 1, wherein the plurality of potential locations includes one or more potential locations within a second downlink transmission opportunity before the downlink transmission opportunity.

4. The method of claim 1, further comprising:
    determining that a content of a slot of the downlink transmission opportunity does not includes information for the UE; and
    entering a sleep state for a duration of the slot based at least in part on determining that the information of the slot is not for the UE.

5. The method of claim 4, further comprising:
    monitoring for a next configured control resource set based at least in part on entering the sleep state.

6. The method of claim 1, wherein the signal is a single waveform detectable using an autocorrelation function.

7. The method of claim 1, wherein the signal is a wide-band waveform comprising one or more repetitions of a short sequence.

8. The method of claim 7, wherein the signal is a channel reservation preamble used to reserve channels for other nodes.

9. The method of claim 1, wherein the signal is detected using a first procedure that is different from a second procedure configured to decode the control resource set, and wherein the first procedure consumes less power when detecting the signal than the second procedure when detecting the signal.

10. The method of claim 1, further comprising:
    identifying a plurality of downlink transmission starting opportunities, wherein the plurality of downlink transmission starting opportunities are positionable at a slot boundary and in a middle of a slot; and
    monitoring for the signal before each of the plurality of downlink transmission starting opportunities, wherein receiving the signal is based at least in part on monitoring for the signal before each of the plurality of downlink transmission starting opportunities.

11. The method of claim 1, wherein the signal is received after a clear channel assessment period of a listen-before-talk procedure of the shared spectrum frequency band.

12. The method of claim 1, further comprising:
identifying a plurality of slots of the downlink transmission opportunity based at least in part on receiving the signal; and
monitoring at least a portion of each slot of the plurality of slots for the control resource set, wherein processing the control resource set is based at least in part on monitoring each slot of the plurality of slots for control resource sets.

13. The method of claim 1, wherein:
the first power mode comprises a sleep mode of the UE;
the second power mode comprises a low-power mode of the UE for performing the discontinuous monitoring; and
the third power mode comprises a fully-awake mode of the UE.

14. A method for wireless communication at a base station, comprising:
identifying information to be transmitted to a user equipment (UE);
identifying a transmission opportunity to transmit the information to the UE using a synchronized communication system operating in a shared spectrum frequency band;
transmitting a signal when the UE is in a second power mode higher than a first power mode of the UE at one of a plurality of potential locations before the transmission opportunity as part of a listen-before-talk (LBT) procedure; and
transmitting a downlink transmission burst when the UE is in a third power mode, the downlink transmission burst comprising one or more slots based at least in part on transmitting the signal, wherein the third power mode is higher than the first power mode and the second power mode.

15. The method of claim 14, wherein the signal is transmitted after a clear channel assessment period of the LBT procedure.

16. The method of claim 14, further comprising:
transmitting the information to the UE during at least one slot of the transmission opportunity.

17. The method of claim 14, further comprising:
transmitting information for a second UE different from the UE during at least one slot of the transmission opportunity.

18. The method of claim 14, wherein:
the transmission opportunity is positionable at a slot boundary or in a middle of a slot; and
transmitting the signal before the transmission opportunity.

19. The method of claim 14, wherein the signal is a single waveform detectable using an autocorrelation function.

20. The method of claim 14, wherein the signal is at least a portion of a wide-band channel reservation preamble.

21. An apparatus for wireless communication at a user equipment (UE), comprising:
a processor;
memory in electronic communication with the processor; and
instructions stored in the memory and executable by the processor to cause the apparatus to:
enter a first power mode of the UE in a synchronized communication system operating in a shared spectrum frequency band;
perform, in a second power mode, discontinuous monitoring of a plurality of potential locations for a signal, wherein the second power mode is higher than the first power mode;
receive the signal in one of the plurality of potential locations;
enter a third power mode, based at least in part on receiving the signal, to process a control resource set associated with a downlink transmission opportunity, wherein the third power mode is higher than the first power mode and the second power mode;
determine that a content of the downlink transmission opportunity will include content for the UE based at least in part on processing the control resource set; and
monitor at least a portion of the downlink transmission opportunity based at least in part on determining that the content includes the content for the UE.

22. The apparatus of claim 21, wherein entering the third power mode further comprises activating one or more additional circuits to process the control resource set.

23. The apparatus of claim 21, wherein the plurality of potential locations includes one or more potential locations within a second downlink transmission opportunity before the downlink transmission opportunity.

24. The apparatus of claim 21, wherein the instructions are further executable by the processor to cause the apparatus to:
determine that a content of a slot of the downlink transmission opportunity does not includes information for the UE;
enter a sleep state for a duration of the slot based at least in part on determining that the information of the slot is not for the UE; and
monitor for a next configured control resource set based at least in part on entering the sleep state.

25. The apparatus of claim 21, wherein the signal is a single waveform detectable using an autocorrelation function.

26. The apparatus of claim 21, wherein the signal is a wide-band waveform comprising one or more repetitions of a short sequence, and wherein the signal is a channel reservation preamble used to reserve channels for other nodes.

27. The apparatus of claim 21, wherein the signal is detected using a first procedure that is different from a second procedure configured to decode the control resource set, and wherein the first procedure consumes less power when detecting the signal than the second procedure when detecting the signal.

28. The apparatus of claim 21, wherein the instructions are further executable by the processor to cause the apparatus to:
identify a plurality of downlink transmission starting opportunities, wherein the plurality of downlink transmission starting opportunities are positionable at a slot boundary and in a middle of a slot; and
monitor for the signal before each of the plurality of downlink transmission starting opportunities, wherein receiving the signal is based at least in part on monitoring for the signal before each of the plurality of downlink transmission starting opportunities.

29. The apparatus of claim 21, wherein the signal is received after a clear channel assessment period of a listen-before-talk procedure of the shared spectrum frequency band.

30. The apparatus of claim 21, wherein the instructions are further executable by the processor to cause the apparatus to:

identify a plurality of slots of the downlink transmission opportunity based at least in part on receiving the signal; and monitor at least a portion of each slot of the plurality of slots for the control resource set, wherein processing the control resource set is based at least in part on monitoring each slot of the plurality of slots for control resource sets.

31. An apparatus for wireless communication at a base station, comprising:

a processor;

memory in electronic communication with the processor; and instructions stored in the memory and executable by the processor to cause the apparatus to:

identify information to be transmitted to a user equipment (UE);

identify a transmission opportunity to transmit the information to the UE using a synchronized communication system operating in a shared spectrum frequency band;

transmit a signal when the UE is in a second power mode higher than a first power mode of the UE at one of a plurality of potential locations before the transmission opportunity as part of a listen-before-talk (LBT) procedure; and transmit a downlink transmission burst when the UE is in a third power mode, the downlink transmission burst comprising one or more slots based at least in part on transmitting the signal, wherein the third power mode is higher than the first power mode and the second power mode.

* * * * *